United States Patent
Muraki et al.

(10) Patent No.: US 10,897,030 B2
(45) Date of Patent: Jan. 19, 2021

(54) PACKAGING MATERIAL FOR POWER STORAGE DEVICE AND METHOD FOR MANUFACTURING PACKAGING MATERIAL FOR POWER STORAGE DEVICE

(71) Applicant: TOPPAN PRINTING CO., LTD., Tokyo (JP)

(72) Inventors: Takuya Muraki, Tokyo (JP); Tomohiko Yamazaki, Tokyo (JP); Masayoshi Suzuta, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 167 days.

(21) Appl. No.: 16/131,668

(22) Filed: Sep. 14, 2018

(65) Prior Publication Data

US 2019/0027715 A1    Jan. 24, 2019

Related U.S. Application Data

(63) Continuation of application No. PCT/JP2017/012964, filed on Mar. 29, 2017.

(30) Foreign Application Priority Data

Apr. 1, 2016  (JP) .................................. 2016-074431
Feb. 23, 2017  (JP) .................................. 2017-032069

(51) Int. Cl.
| | | |
|---|---|---|
| *H01M 2/02* | (2006.01) | |
| *H01G 11/78* | (2013.01) | |
| *B65D 65/40* | (2006.01) | |
| *H01M 2/10* | (2006.01) | |
| *B32B 7/12* | (2006.01) | |
| *B32B 15/04* | (2006.01) | |
| *B32B 37/12* | (2006.01) | |
| *H01G 11/80* | (2013.01) | |
| *H01G 11/84* | (2013.01) | |
| *H01M 2/08* | (2006.01) | |
| *B32B 38/00* | (2006.01) | |

(52) U.S. Cl.
CPC ............ *H01M 2/0287* (2013.01); *B32B 7/12* (2013.01); *B32B 15/04* (2013.01); *B32B 37/1284* (2013.01); *B65D 65/40* (2013.01); *H01G 11/78* (2013.01); *H01G 11/80* (2013.01); *H01G 11/84* (2013.01); *H01M 2/0285* (2013.01); *H01M 2/0292* (2013.01); *H01M 2/08* (2013.01); *H01M 2/1094* (2013.01); *B32B 2038/0076* (2013.01); *B32B 2255/26* (2013.01); *B32B 2457/10* (2013.01); *B32B 2457/16* (2013.01); *B32B 2553/00* (2013.01); *H01M 2002/0297* (2013.01); *Y02E 60/13* (2013.01)

(58) Field of Classification Search
None
See application file for complete search history.

(56) References Cited

U.S. PATENT DOCUMENTS

| | | |
|---|---|---|
| 2009/0191448 A1 | 7/2009 | Yamamto et al. |
| 2014/0370368 A1 | 12/2014 | Kaibin et al. |
| 2015/0380695 A1 | 12/2015 | Hanaki et al. |
| 2019/0036086 A1 * | 1/2019 | Ueda .................. B32B 15/08 |

FOREIGN PATENT DOCUMENTS

| | | |
|---|---|---|
| JP | 2013-101765 A | 5/2013 |
| JP | 2014-007131 A | 1/2014 |
| JP | 2014-185317 A | 10/2014 |
| JP | 2015-024862 A | 2/2015 |
| JP | 2015-176764 A | 10/2015 |

OTHER PUBLICATIONS

Machine Translation of Yamashita et al. JP 2014-007131 (Year: 2014).*
Extended European Search Report dated Dec. 20, 2018 in corresponding application No. 17775254.0.
International Search Report regarding International Appl. No. PCT/JP2017/012964, dated May 16, 2017, 2 pps.

* cited by examiner

*Primary Examiner* — Robert T Butcher
(74) *Attorney, Agent, or Firm* — Foley & Lardner LLP

(57) ABSTRACT

A packaging material for a power storage device, the packaging material including a structure in which at least a substrate protective layer, a substrate layer, an adhesive layer, a metal foil layer, a sealant adhesive layer, and a sealant layer are laminated in this order, wherein the substrate protective layer is a cured product of a raw material containing a polyester resin or an acrylic resin, and a curing agent; the polyester resin or the acrylic resin has reactive groups reactive with the curing agent at a terminal position and/or in a side chain; the curing agent contains an isocyanate other than an alicyclic isocyanate, and an alicyclic isocyanate; and the ratio ([a]/[b]) of the weight of the isocyanate other than an alicyclic isocyanate [a] to the weight of the alicyclic isocyanate [b] is 99/1 to 80/20.

12 Claims, 3 Drawing Sheets

PACKAGING MATERIAL FOR POWER STORAGE DEVICE AND METHOD FOR MANUFACTURING PACKAGING MATERIAL FOR POWER STORAGE DEVICE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/012964, filed on Mar. 29, 2017, which is based upon and claims the benefit of priority to Japanese Patent Application Nos. 2016-074431, filed on Apr. 1, 2016, and 2017-032069, filed on Feb. 23, 2017. The disclosures of which are all hereby incorporated herein by reference in their entireties.

TECHNICAL FIELD

The present invention relates to a packaging material for a power storage device and a method for manufacturing a packaging material for a power storage device.

BACKGROUND

Power storage devices include, for example, secondary batteries, such as lithium ion batteries, nickel hydride batteries, and lead batteries, and electrochemical capacitors, such as electric double layer capacitors. Due to miniaturization of mobile devices, limitation of installation spaces, or the like, further miniaturization of power storage devices is sought, and thus attention is given to lithium ion batteries for their high energy density. Packaging materials for lithium ion batteries have conventionally been metal cans; however, multilayer films are increasingly used because they are lightweight, highly heat dissipating, and produced at low cost.

In such a lithium ion battery using the multilayer film as a packaging material, battery contents (e.g., cathode, separator, anode, electrolyte solution) are covered with a packaging material including an aluminum foil layer to thereby prevent moisture from penetrating into the battery. A lithium ion battery using such a configuration is referred to as an aluminum laminated lithium ion battery.

Embossed lithium ion batteries, for example, are known as aluminum laminated lithium ion batteries. In such an embossed lithium ion battery, a recessed portion is formed at part of the packaging material by cold forming, battery contents are stored in the recessed portion, and the rest of the packaging material is folded back, followed by heat sealing the edge portions (e.g., see PTL 1). With such a lithium ion battery, a recess formed deeper by cold forming enables storage of more battery contents to achieve higher energy density.

CITATION LIST

[Patent Literature] [PTL 1] JP 2013-101765 A

SUMMARY OF THE INVENTION

Technical Problem

However, when deep drawing is performed on a conventional packaging material for a lithium ion battery to form a deep recess, the adhesive layer and the metal foil layer may sometimes be broken. Accordingly, the packaging material is required to have good deep drawing formability.

In order to improve the formability, a nylon film may be used as a substrate layer on the outermost layer of the packaging material. However, when the nylon film, which is basic, is brought into contact with an (acidic) electrolyte for lithium ion batteries, the nylon film is dissolved and cannot exhibit characteristics as a packaging material. Further, the nylon film has low resistance to alcohol.

Moreover, the nylon film used as the substrate layer has high water absorbability, and the substrate layer is more likely to absorb water particularly in high-humidity environments for on-vehicle applications, or environments in which rain water flooding or the like is likely to occur. When voltage is applied from the outside in such a state, insulation properties are reduced, the metal foil layer bonded together with the substrate layer is also energized, and the battery capacity is adversely affected.

When lithium ion batteries are incorporated into products, an adhesive tape (PSA tape) is used to firmly bond the battery cell and the product case. However, when a drop test is conducted for products firmly bonded to battery cells, the battery cell and the product case may be separated. In this case, the ionized cell becomes loose in the product case, and various vibrations impose a load on the terminal part, which may cause short-circuiting. Therefore, stronger bonding between the battery cell and the product case by an adhesive tape is required.

For one of the functions demanded by power storage device manufacturers as one of the long-term reliability performances of packaging materials for power storage devices, there is a test in which power storage devices are stored in a warm water environment for a certain period of time. In this case, there is a problem that interlamellar separation (hereinafter, "delamination") occurs with time between the substrate layer and the metal foil layer of the packaging material.

The present invention has been made in view of the above circumstances, and has an object to provide a packaging material for a power storage device, the packaging material having good electrolyte resistance and alcohol resistance, and also having good adhesion to adhesive tapes. The present invention has another object to provide a packaging material for a power storage device, the packaging material having improved and even high deep drawing formability, delamination resistance, and good insulation properties. The present invention has still another object to provide a method for manufacturing such a packaging material for a power storage device.

Solution to Problem

In order to achieve the above object, the present invention provides a packaging material for a power storage device, the packaging material including a structure in which at least a substrate protective layer, a substrate layer, an adhesive layer, a metal foil layer, a sealant adhesive layer, and a sealant layer are laminated in this order. The substrate protective layer is a cured product of a raw material containing a polyester resin or an acrylic resin, and a curing agent; the polyester resin or the acrylic resin has reactive groups reactive with the curing agent at a terminal position and/or in a side chain; the curing agent contains an isocyanate other than an alicyclic isocyanate, and an alicyclic isocyanate; and the ratio ([a]/[b]) of the weight of the isocyanate other than an alicyclic isocyanate [a] to the weight of the alicyclic isocyanate [b] is 99/1 to 80/20.

The packaging material for a power storage device has good electrolyte resistance and alcohol resistance, and also has good adhesion to adhesive tapes. In general, a nylon film is sometimes used on the outermost layer of a consumer packaging material for a power storage device in order to improve the formability. However, when the nylon film, which is basic, is brought into contact with an (acidic) electrolyte for power storage devices, the nylon is dissolved and cannot be used as a battery cell. In order to solve such problems caused by the films used, in the present invention, a coating layer containing a curing agent mixed with a polyester resin or an acrylic resin is further provided as a substrate protective layer on the outermost layer of the film. In this case, suitable characteristics can be imparted to the coating layer using the resins and curing agent specified above.

In the present invention, the ratio ([B]/[A]) of the number of moles of reactive groups of the curing agent [B] to the number of moles of reactive groups of the polyester resin or acrylic resin [A] is preferably 5 to 60. This improves the formability of the packaging material for a power storage device. If the ratio of [B]/[A] is less than 5, the curing agent has fewer reactive groups; thus, the adhesion between the substrate protective layer and the substrate layer tends to decrease. In contrast, if the ratio of [B]/[A] exceeds 60, the number of bonding points between the polyester resin or acrylic resin, and the curing agent increases, the substrate protective layer tends to be hard, cracks easily occur during deep drawing of the packaging material, and it tends to be difficult to obtain improved and even high deep drawing formability. Moreover, when the ratio of [B]/[A] is 5 to 20, the hardness of the substrate protective layer can be kept low while sufficiently ensuring adhesion between the substrate protective layer and the substrate layer; thus, it is possible to prevent cracks during deep drawing described above, and it is also possible to obtain improved and even high insulation properties in the packaging material after deep drawing.

In the present invention, when a constant voltage of 100 V is applied for 3 minutes between the substrate protective layer and the metal foil layer in a state in which water is adhered to an outermost portion, the electrical resistance is preferably 2000 MΩ or more. This configuration reduces the risk that the metal foil layer is also energized to affect the battery capacity in cases where, for example, a film that easily absorbs moisture (e.g., a Ny film) is used as the substrate layer.

In the present invention, the reactive groups of the polyester resin or acrylic resin are preferably all hydroxyl groups, and the polyester resin or acrylic resin preferably has a hydroxyl value of 5 to 70 KOHmg/g. Moreover, in the present invention, the isocyanate other than an alicyclic isocyanate is preferably an adduct or biuret form of an aliphatic isocyanate. The electrolyte resistance and alcohol resistance of the substrate protective layer can thereby be further improved.

Further, the polyester resin or acrylic resin preferably has a number average molecular weight of 2000 to 30000. Because the number average molecular weight of the polyester resin or acrylic resin is 2000 or more, the electrolyte resistance of the substrate protective layer is further improved when an (acidic) electrolyte for power storage devices is brought into contact with the substrate protective layer, and the alcohol resistance of the substrate protective layer is further improved. In contrast, if the number average molecular weight exceeds 30000, the polyester resin or acrylic resin is less likely to be dissolved in a solvent, and it tends to be difficult to form the substrate protective layer on the substrate layer by coating.

In the present invention, the substrate protective layer preferably has a glass transition temperature (Tg) of 60 to 140° C. When Tg is 60 to 140° C., while further suppressing blocking during winding due to the low Tg of the substrate protective layer, the hardness of the substrate protective layer can be made moderate, and more sufficient resistance to delamination can be obtained.

The substrate protective layer may further contain a filler. This makes it possible to further improve the lubricity of the packaging material, and to impart appearance designability to the packaging material.

The substrate protective layer preferably has a thickness of 1 to 5 μm, and the ratio of the thickness of the substrate protective layer to the thickness of the substrate layer is preferably 35% or less. When the ratio of the thickness of the substrate protective layer is 35%, the substrate protective layer serves to protect the substrate layer, and more sufficient deep drawing formability can be obtained. If the thickness of the substrate protective layer is less than 1 μm, the substrate protective effect to prevent the permeation of water entering and being absorbed from the surface of the substrate protective layer tends to decrease, and water easily penetrates through the substrate protective layer; thus, delamination may occur, or the substrate protective layer itself may be broken during forming. In contrast, if the thickness is more than 5 μm, the substrate protective layer itself may also be broken during forming; thus, delamination tends to occur.

Moreover, the present invention provides a method for manufacturing a packaging material for a power storage device, the method including the steps of bonding a substrate layer to one surface of a metal foil layer via an adhesive layer; forming a substrate protective layer on a surface of the substrate layer on a side opposite of the adhesive layer; and forming a sealant layer via a sealant adhesive layer on a surface of the metal foil layer on a side opposite of the adhesive layer. The substrate protective layer is a cured product of a raw material containing a polyester resin or an acrylic resin, and a curing agent; the polyester resin or the acrylic resin has reactive groups reactive with the curing agent at a terminal position and/or in a side chain; the curing agent contains an isocyanate other than an alicyclic isocyanate, and an alicyclic isocyanate; and the ratio ([a]/[b]) of the weight of the isocyanate other than an alicyclic isocyanate [a] to the weight of the alicyclic isocyanate [b] is 99/1 to 80/20.

Furthermore, the present invention provides a method for manufacturing a packaging material for a power storage device, the method including the steps of forming a substrate protective layer on one surface of a substrate layer; bonding one surface of a metal foil layer via an adhesive layer to a surface of the substrate layer on a side opposite of the substrate protective layer; and forming a sealant layer via a sealant adhesive layer on a surface of the metal foil layer on a side opposite of the adhesive layer. The substrate protective layer is a cured product of a raw material containing a polyester resin or an acrylic resin, and a curing agent; the polyester resin or the acrylic resin has reactive groups reactive with the curing agent at a terminal position and/or in a side chain; the curing agent contains an isocyanate other than an alicyclic isocyanate; and an alicyclic isocyanate; and the ratio ([a]/[b]) of the weight of the isocyanate other than an alicyclic isocyanate [a] to the weight of the alicyclic isocyanate [b] is 99/1 to 80/20.

Advantageous Effects of the Invention

The present invention provides a packaging material for a power storage device, the packaging material having good electrolyte resistance and alcohol resistance, and also having good adhesion to adhesive tapes. Further, the present invention provides a packaging material for a power storage device, the packaging material having improved and even high deep drawing formability, delamination resistance, and good insulation properties. The present invention also provides a method for manufacturing such a packaging material for a power storage device.

DESCRIPTION OF EMBODIMENTS

Figure 1:
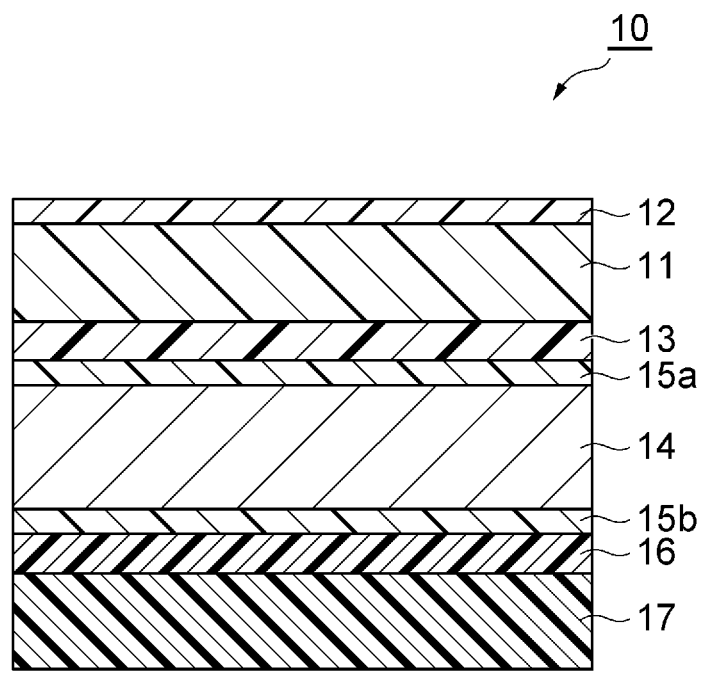
FIG. 1 is a schematic cross-sectional view of a power storage device packaging material, according to an embodiment of the present invention.

With reference to the drawings, preferred or representative embodiments of the present invention will be described in detail. It is to be understood that the present invention is not limited to the following embodiments, which are intended to be representative of the present invention. The representative embodiments described below are merely examples of the present invention, and the design thereof could be appropriately changed by one skilled in the art. In the drawings and embodiment descriptions, the same or corresponding components are denoted by the same reference characters, and duplicate description thereof will be omitted.

[Packaging Material for Power Storage Device]

FIG. 1 is a schematic cross-sectional view of an embodiment of a packaging material for a power storage device of the present invention. As illustrated in FIG. 1, a packaging material (packaging material for power storage device) 10 of the present embodiment is a laminate sequentially laminated with a substrate layer 11, a substrate protective layer 12 provided on a surface of the substrate layer 11, an adhesive layer 13 provided on a surface of the substrate layer 11 on a side opposite of the substrate protective layer 12, a metal foil layer 14 provided on a surface of the adhesive layer 13 on a side opposite of the substrate layer 11 and having anticorrosion treatment layers 15a and 15b on opposing surfaces thereof, a sealant adhesive layer 16 provided on a surface of the metal foil layer 14 on a side opposite of the adhesive layer 13, and a sealant layer 17 provided on a surface of the sealant adhesive layer 16 on a side opposite of the metal foil layer 14. The anticorrosion treatment layer 15a is provided on an adhesive layer 13 side surface of the metal foil layer 14 and the anticorrosion treatment layer 15b is provided on a sealant adhesive layer 16 side surface of the metal foil layer 14. In the packaging material 10, the substrate protective layer 12 is the outermost layer and the sealant layer 17 is the innermost layer. That is, the packaging material 10 is used, with the substrate protective layer 12 being on the outside of the power storage device and the sealant layer 17 being on the inside of the power storage device. Each layer is described below.

(Substrate Layer 11)

The substrate layer 11 imparts heat resistance in a sealing process in the production of power storage devices, and suppresses the formation of pinholes that may occur during molding or distribution. Particularly in the case of, for example, packaging materials for large power storage devices, scratch resistance, chemical resistance, insulating properties, etc., can also be imparted.

The substrate layer 11 preferably includes a resin film made of a resin having insulating properties. Examples of the resin film include stretched or unstretched films, such as polyester films, polyamide films, and polypropylene films. The substrate layer 11 may be a monolayer film made of one of these resin films, or a laminated film made of two or more of these resin films.

Of these films, the substrate layer 11 is preferably a polyamide film, and more preferably a biaxially stretched polyamide film, in terms of good formability. Examples of polyamide resins that form polyamide films include Nylon-6, Nylon-6,6, a copolymer of Nylon-6 and Nylon-6,6, Nylon-6,10, polymetaxylylene adipamide (MXD6), Nylon-11, Nylon-12, and the like. Among these, Nylon 6 (ONy) is preferable in terms of good heat resistance, piercing strength, and impact strength.

Examples of stretching method for the biaxially stretched film include sequential biaxial stretch, tubular biaxial stretch, and simultaneous biaxial stretch. From the perspective of obtaining better deep drawing formability, a biaxially stretched film is preferably stretched using a tubular biaxial stretch method.

The substrate layer 11 preferably has a thickness in the range of 6 to 40 μm and more preferably 10 to 30 μm. When the substrate layer 11 has a thickness of 6 μm or more, pinhole resistance and insulating properties are likely to be improved in the packaging material 10 for a power storage device. If the substrate layer 11 has a thickness of more than 40 μm, the total thickness of the packaging material 10 for a power storage device is increased and the battery electrical capacity may have to be reduced; therefore, a thickness of more than 40 μm is not desirable.

(Substrate Protective Layer 12)

The substrate protective layer 12 is provided on one surface of the substrate layer 11, and is formed using a polyester resin or an acrylic resin, and a curing agent. That is, the substrate protective layer 12 is a cured product of a raw material containing a polyester resin or an acrylic resin, and a curing agent.

The polyester resin is a copolymer using a polycarboxylic acid and a polyhydric alcohol as raw materials, and has reactive groups reactive with the curing agent at a terminal position and/or in a side chain.

The polyester resin is preferably a polyester polyol. Examples of polyester polyols include polyester polyols obtained by reaction of one or more dicarboxylic acids and a diol.

Usable dicarboxylic acids are both aliphatic dicarboxylic acids and aromatic dicarboxylic acids. Specific examples thereof include aliphatic dicarboxylic acids, such as succinic acid, glutaric acid, adipic acid, pimelic acid, suberic acid, azelaic acid, sebacic acid, and brassylic acid; and aromatic dicarboxylic acids, such as isophthalic acid, terephthalic acid, and naphthalene dicarboxylic acid.

Examples of diols include aliphatic diols, such as ethylene glycol, propylene glycol, butanediol, neopentyl glycol, methyl pentanediol, hexanediol, heptanediol, octanediol, nonanediol, decanediol, and dodecanediol; alicyclic diols, such as cyclohexanediol and hydrogenated xylylene glycol; and aromatic diols, such as xylylene glycol.

Moreover, examples of the raw material of the polyester polyol include polyester polyols obtained by reaction of the above dicarboxylic acid with one or more compounds having three or more hydroxyl groups. Unreacted parts of the compound having three or more hydroxyl groups are hydroxyl groups at the terminal position and/or in a side chain of the polyester polyol. Examples of compounds having three or more hydroxyl groups include hexanetriol, trimethylolpropane, and pentaerythritol.

Moreover, the acrylic resin is an acrylic polyol that has hydroxyl groups at the terminal position and/or in a side chain of the repeating unit. Examples of the acrylic polyol include a copolymer obtained by copolymerizing at least a hydroxyl group-containing acrylic monomer and (meth) acrylic acid. In this case, a repeating unit derived from (meth)acrylic acid is preferably contained as a main component. Examples of the hydroxyl group-containing acrylic monomer include 2-hydroxyethyl (meth)acrylate, 2-hydroxypropyl (meth)acrylate, and the like.

Examples of other components copolymerized with a hydroxyl group-containing acrylic monomer and (meth) acrylic acid include alkyl (meth)acrylate-based monomers (examples of alkyl groups include methyl, ethyl, n-propyl, i-propyl, n-butyl, i-butyl, t-butyl, 2-ethylhexyl, and cyclohexyl groups); amide group-containing monomers, such as (meth)acrylamide, N-alkyl (meth)acrylamide, N,N-dialkyl (meth)acrylamide (examples of alkyl groups include methyl, ethyl, n-propyl, i-propyl, n-butyl, i-butyl, t-butyl, 2-ethylhexyl, and cyclohexyl groups), N-alkoxy (meth)acrylamide, N,N-dialkoxy (meth)acrylamide (examples of alkoxy groups include methoxy, ethoxy, butoxy, and isobutoxy groups), N-methylol (meth)acrylamide, and N-phenyl (meth)acrylamide; glycidyl group-containing monomers, such as glycidyl (meth)acrylate and allyl glycidyl ether; silane-containing monomers, such as (meth)acryloxypropyltrimethoxysilane and (meth)acryloxypropyltriethoxysilane; and isocyanate group-containing monomers, such as (meth) acryloxypropyl isocyanate.

The hydroxyl value of the polyester resin or the acrylic resin is preferably 5 to 70 KOHmg/g. When the hydroxyl value is 5 or more, the adhesion between the substrate protective layer 12 and the substrate layer 11 is more exhibited when a polyester resin or an acrylic resin, and a curing agent are appropriately mixed, as described later. In contrast, when the hydroxyl value is 70 or less, the molecular weight of the polyester resin or the acrylic resin tends to increase; thus, the film strength increases, and the cross-linked structure has moderate density and is less likely to be fragile. From such a viewpoint, the hydroxyl value of the polyester resin or the acrylic resin is more preferably 30 to 70 KOHmg/g. The hydroxyl value can be measured in such a manner that, for example, hydroxyl groups in the sample are acetylated with acetic anhydride, and unused acetic acid is titrated with a potassium hydroxide solution.

The number average molecular weight (Mn) of the polyester resin or acrylic resin is preferably 2000 or more, from the perspective of resistance to chemicals, such as (acidic) electrolytes for power storage devices and alcohol. Further, the number average molecular weight (Mn) is preferably 30000 or less, from the perspective of solubility. The number average molecular weight can be measured by gel permeation chromatography (GPC).

As the curing agent, an isocyanate other than an alicyclic isocyanate, and an alicyclic isocyanate are used. These isocyanates are all polyisocyanates containing a plurality of isocyanate groups (hereinafter also referred to simply as "isocyanate" or "polyisocyanate compound"), and serve to crosslink the above polyester resin or acrylic resin. In the present specification, the term "isocyanate" or "polyisocyanate compound" includes an adduct form, a biuret form, and an isocyanurate form of these isocyanates.

The curing agent may be only one of an isocyanate other than an alicyclic isocyanate, and an alicyclic isocyanate.

Usable polyisocyanate compounds include multi-functional aliphatic isocyanate compounds, multi-functional aromatic isocyanate compounds, and multi-functional alicyclic isocyanate compounds. Of these, aliphatic isocyanate compounds can be preferably used, from the perspective of preventing the infiltration of chemicals, such as (acidic) electrolytes for power storage devices and alcohol, to protect the substrate layer 11. Further, a mixture containing such an aliphatic isocyanate compound and an alicyclic isocyanate compound can also be used.

When an isocyanate other than an alicyclic isocyanate, and an alicyclic isocyanate, are used in combination as the polyisocyanate compound, for example, when a mixture of an aliphatic isocyanate compound and an alicyclic isocyanate compound is used in combination, the packaging material 10 for a power storage device has good electrolyte resistance and alcohol resistance, and also has good adhesion to adhesive tapes. In the present embodiment, the ratio ([a]/[b]) of the weight of the isocyanate other than an alicyclic isocyanate [a] to the weight of the alicyclic isocyanate [b] is 99/1 to 80/20. If the ratio of the alicyclic isocyanate is higher than this range, the film quality as a coating layer becomes hard, and the formability of the packaging material 10 for a power storage device is adversely affected. The alicyclic isocyanate, which has a bulky structure, is easily infiltrated with various chemicals (electrolyte and alcohol) etc.; thus, if the ratio of the alicyclic isocyanate is higher than this range, the chemical resistance and alcohol resistance may be impaired. If the ratio of the alicyclic isocyanate is lower than this range, the adhesion to adhesive tapes is inferior.

Examples of isocyanates other than an alicyclic isocyanate include aliphatic isocyanates and aromatic isocyanates. Examples of aliphatic isocyanates include hexamethylene diisocyanate (HDI) and the like; and examples of aromatic isocyanates include tolylene diisocyanate (TDI), diphenylmethane diisocyanate (MDI), and the like. Other examples include modified polyfunctional isocyanates obtained from one or more of these diisocyanates. Among isocyanates other than alicyclic isocyanates, aliphatic isocyanates are preferable, and adduct or biuret forms of aliphatic isocyanates are more preferable.

As the isocyanate other than an alicyclic isocyanate, an adduct or biuret form of hexamethylene diisocyanate is particularly suitably used to impart electrolyte resistance. In addition, when such a curing agent is used, there is a tendency that alcohol resistance is also exhibited. For example, when a battery cell manufacturer performs printing with an inkjet printer for lot trace management, incorrect information is sometimes printed. In that case, reprinting is performed after the printed part is wiped with alcohol, and such a curing agent type is effective in terms of improving the wiping resistance to alcohol.

Examples of aliphatic isocyanate compounds include hexamethylene diisocyanate (HDI), xylylene diisocyanate (XDI), and the like. Examples of alicyclic isocyanate compounds include isophorone diisocyanate (IPDI). Further, examples of aromatic isocyanate compounds include tolylene diisocyanate (TDI), diphenylmethane diisocyanate (MDI), and the like.

In addition, a multimer (e.g., trimer) can also be used as the polyisocyanate compound. Such multimers include an adduct form, a biuret form, an isocyanurate form, etc. An adduct form is preferably used, from the perspective of increasing the deep drawing formability of the packaging material 10. For example, when an adduct form of an aliphatic isocyanate compound, or a mixture of the adduct form and an alicyclic isocyanate compound is used as the polyisocyanate compound, deep drawing forming is possible, and the substrate protective layer 12 that prevents the infiltration of chemicals to efficiently protect the substrate layer 11 can be formed.

The coating liquid constituting the substrate protective layer 12 may also contain other curing agents, in addition to the polyisocyanate compound. Examples of other curing agents include melamine, a compound having a carboxyl group, a compound having a glycidyl group, a compound having a hydroxyl group, carbodiimide, amide, amine, and the like, depending on substituents at the terminal position and/or in a side chain of the polyester resin or acrylic resin to be crosslinked.

The mixing ratio of the polyester resin or acrylic resin, which is a main resin, and a curing agent is such that the ratio of [B]/[A] is 5 to 60, wherein [A] is the number of moles of reactive groups at the terminal position and/or in a side chain of the polyester resin or acrylic resin, and [B] is the number of moles of reactive groups of the isocyanate-based curing agent. The resistance to electrolytes is considered to be affected by the crosslinked structure of the substrate protective layer 12. Accordingly, the inventors consider it to be necessary to increase the crosslinking density by mixing the reactive groups of the curing agent in an excess amount relative to the reactive groups of the polyester resin. When the ratio of [B]/[A] is 5 or more, the crosslinked structure is sufficient, and the electrolyte resistance is better. In contrast, when the ratio of [B]/[A] is 60 or less, the crosslinked structure is not overly dense (the substrate protective layer 12 is not overly hard), and desirable influence is exerted on molding etc. If the curing agent ratio is low, the adhesion between the substrate protective layer 12 and the substrate layer 11 is less likely to be obtained; thus, the above range is preferable. In other words, if the ratio of [B]/[A] is less than 5, the polyisocyanate compound has fewer reactive groups; thus, the adhesion between the substrate protective layer and the substrate layer is likely to decrease. In contrast, if the ratio of [B]/[A] exceeds 60, the number of bonding points between the polyester resin or acrylic resin, and the curing agent increases, the substrate protective layer becomes hard, cracks easily occur during deep drawing of the packaging material, and it is likely to be more difficult to obtain improved or even high deep drawing formability.

Moreover, the ratio of [B]/[A] is more preferably 5 to 20. In this case, the hardness of the substrate protective layer can be kept low while sufficiently ensuring adhesion between the substrate protective layer and the substrate layer; thus, it is possible to sufficiently prevent cracks during deep drawing described above, and it is more or much easier to obtain high insulation properties in the packaging material after deep drawing.

The glass transition temperature (Tg) of the substrate protective layer 12 is preferably 60 to 140° C. If Tg is less than 60° C., the tackiness of the substrate protective layer 12 increases, so that blocking tends to occur. In addition, the hardness as a cured film is likely to be insufficient, and there is a tendency that deep drawing is impossible in cold forming. In contrast, if Tg is more than 140° C., the cured film is too hard, and the layer is rather vulnerable. There is a tendency that cold forming cannot be performed in sufficient drawing depth.

As described above, the substrate protective layer 12 is formed using a raw material containing a polyester resin and a curing agent. The raw material may also contain various additives, such as fillers, flame retardants, lubricants (slip agents), anti-blocking agents, antioxidants, photostabilizers, tackifiers, leveling agents for imparting coating stability, various stabilizers, such as antifoaming agents, catalysts for preventing blocking after coating (promoting the reaction of the coating agent), and reaction retardants for controlling the pot life of the coating agent (acetylacetone being preferably used).

Because the raw material contains a filler, matte treatment can be performed on the outer surface of the substrate protective layer 12. In the present embodiment, the substrate protective layer 12 is a coating layer formed from a raw material containing a polyester resin or an acrylic resin, and a curing agent; thus, for example, compared with nylon (the substrate layer itself), sliding properties tend to be inferior because the system is associated with the reaction, and formability may be reduced. Accordingly, when surface roughness is adjusted by matte treatment, the sliding properties of the surface of the substrate protective layer 12 are improved, and the packaging material 10 can be easily prevented from overly adhering to the die during cold forming; thus, good formability is more likely to be ensured. Moreover, because a matte effect etc. can also be obtained by matte treatment, appearance designability can be imparted to the packaging material 10 by, for example, adjusting the amount of the filler.

Usable examples of the filler include fine particles of inorganic materials (inorganic fillers), such as silica, alumina, barium sulfate, calcium carbonate, and titanium oxide; acrylic beads, urethane beads, and polyester beads (organic fillers); and the like. Of these, silica fine particles are preferable, because resin cracks (blushing due to fine cracks) are less likely to be formed during press molding of the packaging material. In particular, due to the use of fine particles of silica that have been subjected to hydrophobic treatment as a filler, dispersibility during coating is improved, and the filler can be uniformly dispersed in the substrate protective layer. The mean particle size of the filler can be selected as necessary; however, because it is difficult to control the thickness of the packaging material for a power storage device, the filler size is preferably submicron (nm order) to less than 10 μm. In this case, fillers having different particle size distributions may be blended. The mean particle size can be measured by a Coulter counter method.

The content ratio of the filler in the substrate protective layer 12 (the content ratio of the filler based on the total mass of the substrate protective layer 12) is preferably 5 to 50 mass %. Because the content ratio of the filler is set to 5 mass % or more, sliding properties can be easily imparted to the surface of the substrate protective layer 12. Moreover, because the content ratio of the filler is set to 50 mass % or less, film roughness of the surface of the substrate protective layer 12 can be easily prevented. Defects in the appearance of the surface of the packaging material 10 can thereby be prevented.

Examples of lubricants include fatty acid amides, such as oleic acid amide, erucic acid amide, stearic acid amide, behenic acid amide, ethylene bis-oleic acid amide, and ethylene bis-erucic acid amide. Preferable anti-blocking agents are various filler-based anti-blocking agents, such as silica.

The above additives may be used singly or in combination of two or more.

The thickness of the substrate protective layer 12 is selected depending on the required characteristics of the packaging material 10, and may be, for example, about 1 to 10 μm or about 1 to 5 μm. If the thickness is less than 1 μm, there is a tendency that the substrate protective effect to prevent the permeation of water entering and being absorbed from the surface of the substrate protective layer cannot be obtained, and water easily penetrates through the substrate protective layer; thus, delamination may occur, or the substrate protective layer itself may be broken during forming. In contrast, if the thickness is more than 5 μm, the substrate protective layer itself may also be broken during forming; thus, delamination tends to occur.

The ratio of the thickness of the substrate protective layer to the thickness of the substrate layer 11 is preferably 3.5 to 35% or less. When the ratio of the thickness of the substrate protective layer is 3.5 to 35%, the substrate protective layer serves to protect the substrate layer, and more sufficient deep drawing formability can be obtained.

In the present embodiment, when a constant voltage of 100 V is applied for 3 minutes between the substrate protective layer 12 and the metal foil layer 14 in a state in which water is adhered to the substrate protective layer 12 that serves as the outermost portion, the electrical resistance (insulation resistance) between the layers is preferably 2000 MΩ or more, and more preferably 10000 MΩ or more. This configuration reduces the risk that the metal foil layer is also energized to affect the battery capacity in cases where, for example, a film that easily absorbs moisture (e.g., a Ny film) is used as the substrate layer. In particular, in high-humidity environments or environments in which rain water flooding etc. may occur, such as on-vehicle applications and power tool applications, the packaging material preferably has this level of insulating properties even in a state in which water is adhered to the substrate protective layer. The insulation resistance between the substrate protective layer 12 and the metal foil layer 14 specifically refers to the insulation resistance of the laminated portion of the substrate protective layer 12, the substrate layer 11, the adhesive layer 13, and the metal foil layer 14. Anticorrosion treatment layers 15a and 15b may be provided on one surface or both surfaces of the metal foil layer 14, because the influence of the presence of these layers on the insulation resistance value is at a negligible level.

(Adhesive Layer 13)

The adhesive layer 13 adheres the substrate layer 11 to the metal foil layer 14. The adhesive layer 13 has an adhesive force needed to firmly adhere the substrate layer 11 to the metal foil layer 14 and also has conformability (ability to reliably form the adhesive layer 13 on a member without separation, even when the member is deformed, stretched or contracted) to prevent breaking of the metal foil layer 14 by the substrate layer 11 during cold forming.

As an adhesive constituting the adhesive layer 13, there can be used a two-part curing type polyurethane adhesive containing, for example, a main resin made of a polyol such as a polyester polyol, a polyether polyol, an acrylic polyol or the like, and a curing agent such as an aromatic or aliphatic isocyanate. In this adhesive, the molar ratio (=NCO/OH) of the isocyanate groups of the curing agent to the hydroxyl groups of the main resin is preferably in the range of 1 to 10, and more preferably 2 to 5.

After being applied, the polyurethane adhesive is aged at 40° C. or more for 4 days or longer, for example. The aging advances the reaction of the hydroxyl group of the main resin with the isocyanate group of the curing agent, allowing more firm adhesion of the substrate layer 11 to the metal foil layer 14.

From the perspective of obtaining desired adhesive strength, conformability, processability, and the like, the thickness of the adhesive layer 13 is preferably in the range of 1 to 10 μm, and more preferably 2 to 6 μm.

A suitable amount of pigment may be added to the adhesive layer 13 to impart designability. The pigment may be an organic pigment, an inorganic pigment, or a mixture of these pigments.

The type of pigment is not limited within a range that does not impair the adhesion of the adhesive layer 13. Examples of organic pigments include azo-based pigments, phthalocyanine-based pigments, quinacridone-based pigments, anthraquinone-based pigments, dioxazine-based pigments, indigo-thioindigo-based pigments, purinone-perylene-based pigments, isoindolenin-based pigments, and the like; and examples of inorganic pigments include carbon black-based pigments, titanium oxide-based pigments, cadmium-based pigments, lead-based pigments, and chromium oxide-based pigments, as well as mica fine powder, scale foil, and the like.

Specific examples of organic pigments include the following pigments:

Yellow: isoindolinone, isoindoline, quinophthalone, anthraquinone (flavanthrone), azomethine, xanthene, etc.

Orange: diketo-pyrrolo-pyrrole, perylene, anthraquinone, perinone, quinacridone, etc.

Red: anthraquinone, quinacridone, diketo-pyrrolo-pyrrole, perylene, indigoid, etc.

Purple: oxazine (dioxazine), quinacridone, perylene, indigoid, anthraquinone, xanthene, benzimidazolone, violanthrone, etc.

Blue: phthalocyanine, anthraquinone, indigoid, etc.

Green: phthalocyanine, perylene, azomethine, etc.

Specific examples of inorganic pigments include the following pigments:

White: zinc white, lead white, lithopone, titanium dioxide, precipitated barium sulfate, baryta powder, etc.

Red: red lead, iron oxide red, etc.

Yellow: chrome yellow, zinc yellow (zinc yellow type 1, zinc yellow type 2), etc.

Blue: ultramarine blue, Prussian blue (potassium ferric ferrocyanide), etc.

Black: carbon black etc.

The content of pigment is preferably 1 mass % or more, and more preferably 5 mass % or more, based on the total mass of the adhesive layer 13, because higher reliability can be obtained. Moreover, the content of pigment is preferably 50 mass % or less, and more preferably 20 mass % or less, because good adhesion can be obtained.

(Metal Foil Layer 14)

Examples of the metal foil layer 14 include various types of metal foil such as of aluminum and stainless steel. The metal foil layer 14 is preferably aluminum foil from the perspective of processability, such as moisture resistance, ductility and malleability, and costs. The aluminum foil may be generally used soft aluminum foil, but aluminum foil containing iron is preferred for having good pinhole resistance, ductility and malleability.

The aluminum foil containing iron (100 mass %) preferably has an iron content in the range of 0.1 to 9.0 mass % and more preferably 0.5 to 2.0 mass % (e.g., aluminum foil made of the material 8021 or 8079 according to the Japanese Industrial Standards). The iron content of 0.1 mass % or more may lead to obtaining a packaging material 10 having better pinhole resistance, and ductility and malleability. The iron content of 9.0 mass % or less may lead to obtaining a packaging material 10 with better flexibility.

From the perspective of imparting desired ductility and malleability during forming, an annealed soft aluminum foil is even more preferred as the aluminum foil.

The metal foil used for the metal foil layer 14 is preferably degreased, for example, to obtain desired electrolyte resistance. To simplify the production procedure, the metal foil preferably has a surface that is not etched. The degreasing treatment, for example, may be of wet or dry type. However, dry degreasing treatment is preferred from the perspective of simplifying the production procedure.

An example of dry degreasing treatment may be one where treatment time is increased in the step of annealing the metal foil. Sufficient electrolyte resistance may be obtained with the degreasing treatment that is carried out simultaneously with the annealing treatment for softening the metal foil.

The dry degreasing treatment may be one, such as flame treatment and corona treatment, that is other than the annealing treatment. Further, the dry degreasing treatment may be one that oxidatively decomposes and removes contaminants using active oxygen generated by irradiating the metal foil with ultraviolet rays at a specific wavelength.

For example, the wet degreasing treatment may be acid degreasing treatment, alkaline degreasing treatment, or the like. Examples of the acid used for the acid degreasing treatment include inorganic acids, such as sulfuric acid, nitric acid, hydrochloric acid, and hydrofluoric acid. These acids may be used singly or in combination of two or more. For example, the alkali used for the alkaline degreasing treatment may be sodium hydroxide having a high etching effect. Alkaline degreasing treatment may be performed using a material formulated by adding a surfactant or the like to a weakly alkaline material. The wet degreasing treatment set forth above may be performed through immersion or spraying, for example.

From the perspective of barrier properties, pinhole resistance, and processability, the metal foil layer 14 preferably has a thickness in the range of 9 to 200 μm, more preferably 15 to 150 μm, and even more preferably 15 to 100 μm. The metal foil layer 14 with a thickness of 9 μm or more may be able to make the layer less breakable even when stress is applied thereto by molding. The metal foil layer 14 with a thickness of 200 μm or less may be able to curb the increase in mass of the packaging material and minimize the decrease in weight energy density of the power storage device.

(Anticorrosion Treatment Layers 15a and 15b)

The anticorrosion treatment layers 15a and 15b prevent or suppress corrosion of the metal foil layer 14 due to the electrolyte or hydrofluoric acid produced by reaction of the electrolyte with water. The anticorrosion treatment layer 15a increases the adhesive force between the metal foil layer 14 and the adhesive layer 13. The anticorrosion treatment layer 15b increases the adhesive force between the metal foil layer 14 and the sealant adhesive layer 16. The anticorrosion treatment layers 15a and 15b may be identically formed or may be differently formed.

The anticorrosion treatment layers 15a and 15b can be formed by, for example, applying degreasing treatment, hydrothermal conversion treatment, anodizing treatment, chemical conversion treatment, or coating-type anticorrosion treatment where a coating agent having anticorrosion ability is coated, or a combination of these treatments, to a layer serving as a base material for the anticorrosion treatment layers 15a and 15b.

Of the above treatments, the degreasing treatment, hydrothermal conversion treatment and anodizing treatment, particularly, the hydrothermal conversion treatment and the anodizing treatment, are ones where the metal foil (aluminum foil) is dissolved with a treating agent on the surface thereof to form a metal compound (aluminum compound (boehmite, alumite)) having good corrosion resistance. In this sense, these treatments may be embraced within the definition of chemical conversion treatments because they provide a co-continuous structure that is formed covering from the metal foil layer 14 to the anticorrosion treatment layers 15a and 15b.

Examples of the degreasing treatment include acid degreasing treatment and alkaline degreasing treatment. The acid degreasing treatment may be one using the inorganic acid mentioned above, such as sulfuric acid, nitric acid, hydrochloric acid, and hydrofluoric acid, singly or using acid obtained by mixing them, or the like. Use of an acid degreasing agent, as the acid degreasing treatment, obtained by dissolving a fluorine-containing compound, such as monosodium ammonium bifluoride, with the above inorganic acid can not only achieve the degreasing effect of the metal foil layer 14, but form a passive state metal fluoride, and is thus effective in terms of hydrofluoric acid resistance. The alkaline degreasing treatment may be one using sodium hydroxide, or the like.

For example, the hydrothermal conversion treatment that can be used may be boehmite treatment of immersing the metal foil layer 14 in boiling water with triethanolamine added thereto. For example, the anodizing treatment that can be used may be alumite treatment. Examples of the chemical conversion treatment that can be used include chromate treatment, zirconium treatment, titanium treatment, vanadium treatment, molybdenum treatment, calcium phosphate treatment, strontium hydroxide treatment, cerium treatment, ruthenium treatment, or treatment that is a combination of two or more of these treatments. When performing the hydrothermal conversion treatment, anodizing treatment or chemical conversion treatment, the aforementioned degreasing treatment is preferably performed in advance.

The chemical conversion treatment is not limited to a wet type, but may be one, for example, in which treatment agents used for the treatment are mixed with a resin component and applied. The anticorrosion treatment may preferably be of a coating type chromate treatment because it maximizes the anticorrosion effect and is convenient for liquid waste disposal.

The coating agent used in the coating type anticorrosion treatment where a coating agent having anticorrosion ability is applied includes one which contains at least one selected from the group consisting of a rare earth element oxide sol, an anionic polymer and a cationic polymer. In particular, a preferred method is one using a coating agent containing a rare earth element oxide sol.

The method using a coating agent containing a rare earth element oxide sol is a pure coating type anticorrosion treatment. When using this method, an anticorrosion effect can be imparted to the metal foil layer 14 even using ordinary coating methods. The layer formed by use of a rare earth element oxide sol has an anticorrosion effect (inhibitor effect) on the metal foil layer 14 and these sols are favorable materials from an environmental aspect.

The rare earth element oxide sol contains microparticles (e.g., particles having a mean particle size of 100 nm or less) of rare earth element oxide dispersed in a liquid dispersion medium. As the rare earth element oxide, mention can be made of cerium oxide, yttrium oxide, neodymium oxide, lanthanum oxide, or the like. Cerium oxide is preferred among them. This allows more improvement in adhesion with the metal foil layer 14. Examples of the liquid dispersion medium used for the rare earth element oxide sol include various solvents, such as, water, alcoholic solvents, hydrocarbon-based solvents, ketone-based solvents, ester-based solvents, and ether-based solvents. Water is preferred among them. The rare earth element oxides contained in the anticorrosion treatment layers 15a and 15b may be used singly or in combination of two or more.

To stabilize dispersion of the rare earth element oxide particles, the rare earth element oxide sol preferably contains a dispersion stabilizer, including an inorganic acid, such as nitric acid, hydrochloric acid, or phosphoric acid, an organic acid, such as acetic acid, malic acid, ascorbic acid, or lactic acid, a salt of these acids, or the like. Of these dispersion stabilizers, phosphoric acid or phosphate in particular is preferably used. In addition to stabilizing dispersion of the rare earth element oxide particles, use of these materials achieves such effects, in the usage of the packaging material for a power storage device, as improving adhesion to the metal foil layer 14 with the chelating ability of phosphoric acid, imparting electrolyte resistance by trapping metal ions eluted due to the influence of hydrofluoric acid (forming a passive state), improving cohesive force of the rare earth element oxide layer due to the ease of producing dehydration condensation of phosphoric acid even at low temperatures, and the like. Examples of the phosphoric acid or phosphate used as the dispersion stabilizer include orthophosphoric acid, pyrophosphoric acid, metaphosphoric acid, alkali metal salt or ammonium salt thereof, and the like. Of these materials, condensed phosphoric acid, such as trimetaphosphoric acid, tetrametaphosphoric acid, hexametaphosphoric acid, and ultrametaphosphoric acid, or alkali metal salt or ammonium salt thereof is preferred in terms of allowing the packaging material for a power storage device to express its function. In particular, considering the dry film formability (drying capacity, heat capacity) when forming a layer containing rare earth oxide through various types of coating method using a coating composition containing the rare earth element oxide sol, an agent having good reactivity at low temperatures is preferred. Specifically, a sodium salt is preferred because of its good dehydration condensation properties at low temperatures. As the phosphate, a water-soluble salt is preferred. Phosphoric acids or phosphates contained in the anticorrosion treatment layers 15a and 15b may be used singly or in combination of two or more.

Phosphoric acid or salt thereof is blended in the rare earth element oxide sol preferably in an amount of 1 part by mass or more, and more preferably 5 parts by mass or more, relative to 100 parts by mass of rare earth element oxide. A content of 1 part by mass or more can achieve good stability of the sol and easily satisfy the function as the packaging material for a power storage device. The upper limit of phosphoric acid or salt thereof to be blended relative to 100 parts by mass of rare earth element oxide may be in a range not lowering the function of the rare earth element oxide sol, and may preferably be 100 parts by mass or less, more preferably 50 parts by mass or less, and even more preferably 20 parts by mass or less, relative to 100 parts by mass of rare earth element oxide.

The layer formed from the rare earth element oxide sol is an aggregate of inorganic particles and therefore the cohesive force of the layer is low even after a dry curing step. To compensate for the cohesive force of this layer, complexing with an anionic polymer is favorable.

A specific example of the anionic polymer may be a polymer having a carboxyl group, examples of which include poly(meth)acrylic acid (or a salt thereof) and copolymers having poly(meth)acrylic acid as a main component thereof. Examples of the copolymerization component of the copolymers include: alkyl(meth)acrylate-based monomers (of which examples of alkyl groups include a methyl group, an ethyl group, an n-propyl group, an i-propyl group, an n-butyl group, an i-butyl group, a t-butyl group, a 2-ethylhexyl group, and a cyclohexyl group); amide group-containing monomers, such as (meth)acrylamide, N-alkyl(meth)acrylamide, N,N-dialkyl(meth)acrylamide (of which examples of alkyl groups include a methyl group, an ethyl group, an n-propyl group, an i-propyl group, an n-butyl group, an i-butyl group, a t-butyl group, a 2-ethylhexyl group, and a cyclohexyl group), N-alkoxy(meth)acrylamide, N,N-dialkoxy(meth)acrylamide (of which examples of alkoxy groups include a methoxy group, an ethoxy group, a butoxy group, and an isobutoxy group), N-methylol(meth)acrylamide, and N-phenyl(meth)acrylamide; hydroxyl group-containing monomers, such as 2-hydroxyethyl(meth)acrylate and 2-hydroxypropyl(meth)acrylate; glycidyl group-containing monomers, such as glycidyl(meth)acrylate and allyl glycidyl ether; silane-containing monomers, such as (meth)acryloxypropyl trimethoxysilane and (meth)acryloxypropyl triethoxysilane; and isocyanate group-containing monomers, such as (meth)acryloxypropyl isocyanate. The examples also include styrene, α-methylstyrene, vinyl methyl ether, vinyl ethyl ether, maleic acid, alkyl maleate monoester, fumaric acid, alkyl fumarate monoester, itaconic acid, alkyl itaconate monoester, (meth)acrylonitrile, vinylidene chloride, ethylene, propylene, vinyl chloride, vinyl acetate, and butadiene.

The anionic polymer improves the stability of the anticorrosion treatment layers 15a and 15b (oxide layers) obtained using the rare earth element oxide sol. This is achieved by the effect of protecting the hard and brittle oxide layers with an acrylic resin component, and the effect of capturing ionic contamination (particularly, sodium ion) derived from the phosphate contained in the rare earth oxide sol (cation catcher). In other words, when alkali metal ion or alkaline earth metal ion, such as sodium in particular, is contained in the anticorrosion treatment layers 15a and 15b obtained using the rare earth element oxide sol, the anticorrosion treatment layers 15a and 15b are prone to deteriorate starting from the ion-containing site. Accordingly, sodium ion or the like contained in the rare earth oxide sol is immobilized using the anionic polymer to thereby improve durability of the anticorrosion treatment layers 15a and 15b.

The anticorrosion treatment layers 15a and 15b produced by combining the anionic polymer with the rare earth element oxide sol have anticorrosion ability equivalent to that of the anticorrosion treatment layers 15a and 15b formed by applying chromate treatment to the metal foil layer 14. The anionic polymer preferably has a structure where a substantially water soluble polyanionic polymer is cross-linked. For example, the cross-linking agent used for forming this structure may be a compound having an isocyanate group, a glycidyl group, a carboxy group, or an oxazoline group. A silane coupling agent may be used for introducing a cross-linking site having a siloxane bond.

Examples of the compound having an isocyanate group include: diisocyanates such as tolylene diisocyanate, xylylene diisocyanate or its hydrogenated product, hexamethylene diisocyanate, 4,4'-diphenylmethane diisocyanate or its hydrogenated product, and isophorone diisocyanate; polyisocyanates including adducts of these isocyanates reacted with polyhydric alcohols such as trimethylolpropane, biuret forms obtained by reaction of the isocyanates with water, or isocyanurate forms that are trimers of the isocyanates; or blocked polyisocyanates obtained by blocking these polyisocyanates with alcohols, lactams, oximes and the like.

Examples of the compound having a glycidyl group include: epoxy compounds obtained by reaction of glycols, such as ethylene glycol, diethylene glycol, triethylene glycol, polyethylene glycol, propylene glycol, dipropylene glycol, tripropylene glycol, polypropylene glycol, 1,4-butanediol, 1,6-hexanediol, and neopentyl glycol, with epichlorohydrin; epoxy compounds obtained by reaction of polyhydric alcohols, such as glycerine, polyglycerine, trimethylolpropane, pentaerythritol, and sorbitol, with epichlorohydrin; and epoxy compounds obtained by reaction of dicarboxylic acids, such as phthalic acid, terephthalic acid, oxalic acid, and adipic acid, with epichlorohydrin.

The compounds having a carboxy group include various aliphatic or aromatic dicarboxylic acids, and include, further, poly(meth)acrylic acids, or alkali (earth) metal salts of poly(meth)acrylic acids.

The compounds having an oxazoline group include, for example, low molecular weight compounds having two or more oxazoline units. Alternatively, where polymerizable monomers such as isopropenyl oxazoline are used, mention may be made of compounds obtained by copolymerizing acrylic monomers such as (meth)acrylic acid, (meth)acrylic alkyl esters, hydroxyalkyl (meth)acrylates and the like.

The silane coupling agents include γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane, N-β-(aminoethyl)-γ-aminopropyltrimethoxysilane, and γ-isocyanatopropylethoxysilane. In particular, when the reactivity with an anionic polymer is considered, an epoxysilane, an aminosilane and an isocyanate silane are preferred.

The cross-linking agent is blended in an amount preferably in the range of 1 to 50 parts by mass, and more preferably from 10 to 20 parts by mass, relative to 100 parts by mass of the anionic polymer. When the ratio of the cross-linking agent is 1 part by mass or more relative to 100 parts by mass of the anionic polymer, a cross-linking structure is easily sufficiently formed. When the ratio of the cross-linking agent is 50 parts by mass or less relative to 100 parts by mass of the anionic polymer, the pot life of the coating agent improves.

The method of cross-linking the anionic polymer is not limited to the use of the aforementioned cross-linking agents, but may be one using a titanium or zirconium compound to form ionic crosslinkage. The coating composition forming the anticorrosion treatment layer 15a may be applied to these materials.

The anticorrosion treatment layers 15a and 15b described above are formed as chemical conversion treatment layers on the metal foil layer 14 using chemical conversion treatment, typical of which is chromate treatment. To form a graded structure in association with the metal foil layer 14, the metal foil layer 14 is treated, in the chemical conversion treatment, with a chemical conversion treatment agent, which is particularly formulated with addition of hydrofluoric acid, hydrochloric acid, nitric acid, sulfuric acid or a salt thereof. The treated metal foil layer 14 is then reacted with a chromium or non-chromium compound to form the chemical conversion treatment layers on the metal foil layer 14. However, the chemical conversion treatment using the acid as the chemical conversion treatment agent may entail environmental degradation and corrosion of the coating apparatus.

In contrast, the anticorrosion treatment layers 15a and 15b of coating type as mentioned above do not have to form a graded structure with respect to the metal foil layer 14, unlike in the chemical conversion treatment typical of which is chromate treatment. Accordingly, the nature of the coating agent should not be restricted to acidity, alkalinity, neutrality, or the like, and accordingly a good work environment is achieved. In addition, an alternative to chromate treatment using a chromium compound is sought in terms of environmental health. From this perspective as well, the anticorrosion treatment layers 15a and 15b of coating type are preferred.

The anticorrosion treatment layers 15a and 15b may have a laminated structure in which a cationic polymer is further laminated as needed. The cationic polymer may be polyethyleneimine, an ionic polymer complex made of a polyethyleneimine and a polymer having carboxylic acid, a primary amine-grafted acrylic resin having a primary amine grafted to an acrylic main backbone, polyallylamine and derivatives thereof, or an aminophenol resin.

Examples of the "polymer having carboxylic acid" forming the ionic polymer complex include polycarboxylic acid (salt), a copolymer produced by introducing a comonomer into polycarboxylic acid (salt), and polysaccharides having a carboxy group. Examples of the polycarboxylic acid (salt) include polyacrylic acid, and ionic salts thereof. Examples of the polysaccharides having a carboxy group include carboxymethylcellulose, and ionic salts thereof. Examples of the ionic salt include an alkali metal salt, and alkaline earth metal.

The primary amine-grafted acrylic resin is a resin having a primary amine grafted to an acrylic main backbone. The acrylic main backbone may include various monomers, such as poly(meth)acrylic acid, used for the acrylic polyol mentioned above. The primary amine grafted to the acrylic main backbone may be ethyleneimine or the like.

The polyallylamine or a derivative thereof that can be used may be a homopolymer or a copolymer of allylamine, allylamine amide sulfate, diallylamine, dimethylallylamine, and the like. These amines may be used in the form of free amine, or may be stabilized by acetic acid or hydrochloric acid. The copolymer may contain maleic acid, sulfur dioxide, or the like as a component. A type of amine imparted with thermal cross-linking properties by partially methoxylating a primary amine may be used. These cationic polymers may be used singly or in combination of two or more. Of these cationic polymers, at least one selected from the group consisting of polyallylamine and a derivative thereof is preferred.

The cationic polymer is preferably used in combination with a cross-linking agent having a functional group capable of reacting with amine/imine, such as a carboxy group or a glycidyl group. The cross-linking agent to be used in combination with the cationic polymer may be a polymer having carboxylic acid that forms an ionic polymer complex with polyethyleneimine, of which examples include: polycarboxylic acid (salt), such as polyacrylic acid or ionic salt thereof; a copolymer produced by introducing a comonomer thereinto; and polysaccharides having a carboxy group, such as carboxymethylcellulose or ionic salt thereof.

In the present embodiment, a cationic polymer is described as a component constituting the anticorrosion treatment layers 15a and 15b. This is based on an intensive investigation using various compounds to find ones imparting electrolyte resistance and hydrofluoric acid resistance to the packaging material for a power storage device as required thereof. As a result, cationic polymers have been found to be compounds that are capable of imparting electrolyte resistance and hydrofluoric acid resistance. This is believed to be because damage to the metal foil layer 14 is suppressed and reduced by capturing fluoride ion with the cationic group (anion catcher). The cationic polymer is also quite preferred from the perspective of improving adhesion between the anticorrosion treatment layer 15b and the sealant adhesive layer 16. Since the cationic polymer is water soluble similar to the anionic polymer mentioned above, water resistance is improved by forming a cross-linking structure using the cross-linking agent mentioned above. Thus, a cross-linking structure can also be formed by using the cationic polymer. Accordingly, when the rare earth oxide sol is used for forming the anticorrosion treatment layers 15a and 15b, the cationic polymer may be used as the protective layer instead of the anionic polymer.

From the above description, combinations of the above coating type anticorrosion treatments may be (1) rare earth oxide sol alone, (2) anionic polymer alone, (3) cationic polymer alone, (4) rare earth oxide sol+anionic polymer (laminated composite), (5) rare earth oxide sol+cationic polymer (laminated composite), (6) (rare earth oxide sol+anionic polymer: laminated composite)/cationic polymer (multilayer), (7) (rare earth oxide sol+cationic polymer: laminated composite)/anionic polymer (multilayer), and the like. Of these combinations, (1) and (4) through (7) are preferred and (4) through (7) are more preferred. For the anticorrosion treatment layer 15a, (6) is particularly preferred because an anticorrosion effect and an anchor effect (adhesion improvement effect) are achieved by a single layer. For the anticorrosion treatment layer 15b, (6) and (7) are particularly preferred because it is easier to keep the sealant layer 17 side electrolyte resistance. However, the present embodiment should not be limited to the above combinations. An example of selecting the anticorrosion treatment is as follows. Specifically, when the sealant adhesive layer 16 is formed of a modified polyolefin resin, the cationic polymer is designed to be provided on the surface contacting the sealant adhesive layer 16 (e.g., configurations (5) and (6)) since the cationic polymer is a material quite preferable in terms of good adhesion with a modified polyolefin resin that will be mentioned in the description of the sealant adhesive layer 16 below.

The anticorrosion treatment layers 15a and 15b are not limited to the layers described above. For example, they may be formed by using an agent produced by blending phosphoric acid and a chromium compound into a resin binder (aminophenol resin etc.), as in a coating type chromate based on a known technique. Use of this treatment agent enables formation of a layer that is both corrosion-resistant and adhesive. To improve adhesion, the chemical conversion treatment layer described above (the layer formed through degreasing treatment, hydrothermal conversion treatment, anodizing treatment, chemical conversion treatment, or a combination thereof) may be treated in a composite manner using the cationic polymer and/or the anionic polymer mentioned above. Alternatively, using these treatments in combination, the cationic polymer and/or the anionic polymer may be laminated as a multilayer structure. While the stability of the coating agent has to be considered, a layer that is both corrosion-resistant and adhesive can be achieved by using a coating agent that is a one-liquid product of the rare earth oxide sol and the cationic polymer or the anionic polymer obtained in advance.

The anticorrosion treatment layers 15a and 15b preferably have mass per unit area in the range of 0.005 to 0.200 g/m$^2$, and more preferably 0.010 to 0.100 g/m$^2$. When 0.005 g/m$^2$ or more, the metal foil layer 14 can be easily made corrosion-resistant. The mass per unit area exceeding 0.200 g/m$^2$ will saturate the anticorrosivity and no further effect can be expected. In contrast, when the rare earth oxide sol is used, a thick coating may cause insufficient thermal curing during drying and decrease the cohesive force. Although the above description is given using mass per unit area, the specific gravity, if available, can be used in terms of thickness.

The respective thicknesses of the anticorrosion treatment layers 15a and 15b are preferably, for example, in the range of 10 nm to 5 μm, and more preferably 20 to 500 nm, from the perspective of corrosion-resistant and anchoring functions.

(Sealant Adhesive Layer 16)

The sealant adhesive layer 16 adheres the sealant layer 17 to the metal foil layer 14 formed with the anticorrosion treatment layer 15b. The packaging material 10 is roughly categorized into a heat lamination structure and a dry lamination structure, depending on the adhesive component forming the sealant adhesive layer 16.

The adhesive component forming the sealant adhesive layer 16 in the heat lamination structure is preferably an acid modified polyolefin-based resin obtained by graft modifying a polyolefin-based resin with acid. The acid modified polyolefin-based resin, which has a polar group introduced into part of the nonpolar polyolefin-based resin, can firmly adhere to both the sealant layer 17 composed of a nonpolar polyolefin-based resin film or the like, and the anticorrosion treatment layer 15b mostly having polarity. Use of the acid modified polyolefin-based resin improves resistance of the packaging material 10 to the contents, such as the electrolyte, and easily prevents lowering of the adhesive force due to deterioration of the sealant adhesive layer 16 even when hydrofluoric acid is produced inside the battery.

Examples of the polyolefin-based resin for the acid modified polyolefin-based resin include: low-, medium- and high-density polyethylenes; ethylene-α olefin copolymers; polypropylenes; and propylene-α olefin copolymers. The polyolefin resin in the form of a copolymer may be a block copolymer or may be a random copolymer. The polyolefin resin that can be used may also be a copolymer obtained by copolymerizing polar molecules such as of acrylic acid or methacrylic acid with those materials mentioned above, a polymer such as cross-linked polyolefin, or the like. The acid to modify the polyolefin-based resin may be carboxylic acid, an epoxy compound, acid anhydride, or the like, and maleic anhydride is preferred. The acid modified polyolefin-based resins used for the sealant adhesive layer 16 may be used singly or in combination of two or more.

The sealant adhesive layer 16 of the heat lamination structure is formed by extruding the aforementioned adhesive component with an extruder. The sealant adhesive layer 16 of the heat lamination structure preferably has a thickness in the range of 8 to 50 μm.

The adhesive component forming the sealant adhesive layer 16 of the dry lamination structure may be ones, for example, similar to those mentioned for the adhesive layer 13. In this case, to prevent or reduce swelling due to the electrolyte, and hydrolysis due to hydrofluoric acid, the composition of the adhesive is preferably designed so as to contain a main resin with a backbone not easily hydrolyzed and improve cross-linking density.

To improve cross-linking density, some substance may be added to the adhesive, the substance being, for example, a dimer fatty acid, an ester or a hydrogenated product of the dimer fatty acid, a reduced glycol of the dimer fatty acid, or a reduced glycol of the ester or the hydrogenated product of the dimer fatty acid. The dimer fatty acid is obtained by dimerizing various unsaturated fatty acids, and can have a structure, for example, of acyclic type, monocyclic type, polycyclic type, and aromatic ring type.

The fatty acid as a starter of the dimer fatty acid is not limited. With such dimer fatty acid as being an essential component, a dibasic acid such as that used for ordinary polyester polyol may be introduced. The curing agent that can be used for the main resin forming the sealant adhesive layer 16 may be, for example, an isocyanate compound that may also be used as a chain elongation agent for polyester polyol. Thus, cross-linking density of the adhesive coating increases, which leads to improving solubility and swelling properties. Also, substrate adhesion is also expected to be improved due to increase in urethane group concentration.

The sealant adhesive layer 16 having the dry laminate structure has a bonding part such as of an ester group and a urethane group which is easily hydrolysable. Therefore, for usage requiring much higher reliability, an adhesive component having a heat lamination structure is preferably used as the sealant adhesive layer 16. In the case of the dry laminate structure, for example, the various curing agents mentioned above are blended into a coating agent where the acid modified polyolefin resin is dissolved or dispersed in a solvent, such as toluene or methylcyclohexane (MCH), followed by application and drying to thereby form the sealant adhesive layer 16. In this case, the sealant adhesive layer 16 of the dry laminate structure may contain a compound that can be covalently bound to the anticorrosion treatment layer 15b. The curing agent used in this case is, for example, at least one compound selected from the group consisting of polyfunctional isocyanate compounds, glycidyl compounds, compounds having a carboxyl group, and compounds having an oxazoline group.

When forming the sealant adhesive layer 16 using extrusion molding, the adhesion resin tends to be oriented in MD (extrusion direction) due to the stress or the like generated during the extrusion molding. In this case, to alleviate the anisotropy of the sealant adhesive layer 16, an elastomer may be blended in the sealant adhesive layer 16. As the elastomer to be blended in the sealant adhesive layer 16, for example, an olefin-based elastomer, a styrene-based elastomer, or the like may be used.

The elastomer preferably has a mean particle size that can improve the compatibility of the elastomer with the adhesive resin and improve the effect of alleviating the anisotropy of the sealant adhesive layer 16. Specifically, the mean particle size of the elastomer is preferably 200 nm or less, for example.

The mean particle size of the elastomer is determined by, for example, capturing an enlarged image of a cross section of an elastomer composition using an electron microscope, followed by image analysis for the measurement of a mean particle size of dispersed cross-linked rubber components. The elastomers mentioned above may be used singly or in combination of two or more.

If an elastomer is blended in the sealant adhesive layer 16, the amount of the elastomer added to the sealant adhesive layer 16 (100 mass %) is, for example, preferably in the range of 1 to 25 mass % and more preferably 10 to 20 mass %. When the blending amount of the elastomer is 1 mass % or more, improvement is likely to be achieved in compatibility with the adhesion resin, and also in the effect of alleviating the anisotropy of the sealant adhesive layer 16. When the blending amount of the elastomer is 25 mass % or less, improvement is likely to be achieved in the effect of preventing or reducing swelling of the sealant adhesive layer 16 due to the electrolyte.

The sealant adhesive layer 16 may be, for example, a dispersed adhesive resin solution in which an adhesive resin is dispersed in an organic solvent.

The sealant adhesive layer 16 when provided to the heat lamination structure preferably has a thickness in the range of 8 to 50 μm, and more preferably 20 to 40 μm. The sealant adhesive layer 16 having a thickness of 8 μm or more can easily obtain sufficient adhesion strength between the metal foil layer 14 and the sealant layer 17. The sealant adhesive layer 16 having a thickness of 50 μm or less can easily reduce the amount of water penetrating from an end surface of the packaging material into the battery element in the interior. The sealant adhesive layer 16 when provided to the dry lamination structure preferably has a thickness in the range of 1 to 5 μm. The sealant adhesive layer 16 having a thickness of 1 μm or more can easily obtain sufficient adhesion strength between the metal foil layer 14 and the sealant layer 17. The sealant adhesive layer 16 having a thickness of 5 μm or less is capable of preventing or reducing cracking therein.

(Sealant Layer 17)

The sealant layer 17 imparts sealability to the packaging material 10 when heat sealed, and is located on the inward side for heat sealing when the power storage device is assembled. The sealant layer 17 may be a resin film made of a polyolefin-based resin or an acid-modified polyolefin-based resin obtained by graft-modifying a polyolefin-based resin with acid such as maleic anhydride. Of these materials, a polyolefin-based resin that improves the barrier properties against water vapor and is capable of forming the shape of the power storage device without being excessively deformed by heat sealing is preferred, and polypropylene is particularly preferred.

Examples of the polyolefin-based resin include: low-, medium- and high-density polyethylenes; ethylene-α olefin copolymers; polypropylenes; and propylene-α olefin copolymers. The polyolefin resin in the form of a copolymer may be a block copolymer or may be a random copolymer. These polyolefin-based resins may be used singly or in combination of two or more.

Among these, the sealant layer 17 is preferably a polyolefin-based resin that can improve water vapor barrier properties and that can configure the form of the power storage device without being excessively deformed by heat sealing; polypropylene is particularly preferable.

Some other substances may be added to the above types of polypropylenes, that is, random polypropylene, homo polypropylene, and block polypropylene, the substance being a low crystallinity ethylene-butene copolymer, a low crystallinity propylene-butene copolymer, terpolymer formed of a three-component copolymer of ethylene, butene, and propylene, an anti-blocking agent (AB agent), such as silica, zeolite, and acrylic resin beads, a slip agent, such as a fatty acid amide, or the like.

The acid-modified polyolefin-based resin includes, for example, those resins which are similar to ones mentioned in the sealant adhesive layer 16.

The sealant layer 17 may be a single layer film or may be a multilayer film, which may be selected according to the required ability. For example, to impart moisture resistance, a multilayer film with interposition of resins, such as an ethylene-cyclic olefin copolymer and polymethylpentene, may be used.

The sealant layer 17 may contain various additives, such as a flame retardant, a slip agent, an anti-blocking agent, an antioxidant, a photostabilizer, and a tackifier.

A heat sealable film formed by extrusion may be used as the sealant layer 17. In this case, the orientation of the sealable film tends to conform to the direction of its extrusion. Therefore, from the perspective of alleviating the anisotropy of the sealant layer 17 due to the orientation, an elastomer may be blended in the heat sealable film. Blending an elastomer, blushing of the sealant layer 17 is prevented or reduced when the packaging material 10 for a power storage device is cold-formed for formation of a recess.

The elastomer that can be used for forming the sealant layer 17 may be, for example, the same materials as those mentioned as the elastomer forming the sealant adhesive layer 16. When the sealant layer 17 has a multilayer film structure, at least one of the plurality of layers constituting the multilayer film structure may be configured to contain the elastomer. For example, when the sealant layer 17 has a three-layer laminated structure of random polypropylene layer/block polypropylene layer/random polypropylene layer, the elastomer may be blended in only the block polypropylene layer or only in the random polypropylene layers, or may be blended in both the random polypropylene layers and the block polypropylene layer.

The sealant layer 17 may contain a lubricant to impart lubricity thereto. Then, when a recess is formed in the packaging material 10 for a power storage device by cold forming, the sealant layer 17 containing a lubricant can prevent the packaging material 10 from being stretched more than necessary in the areas to be shaped into side portions and corners of the recess where stretching degree is high. This can prevent separation between the metal foil layer 14 and the sealant adhesive layer 16, or prevent breaking and blushing due to cracks in the sealant layer 17 and the sealant adhesive layer 16.

When the sealant layer 17 contains a lubricant, the content in the sealant layer 17 (100 mass %) is preferably in the range of 0.001 to 0.5 mass %. When the content of lubricant is 0.001 mass % or more, blushing of the sealant layer 17 is likely to be further reduced during cold forming. When the content of lubricant is 0.5 mass % or less, lowering in adhesion strength is likely to be minimized with respect to a surface of another layer contacting a surface of the sealant layer 17.

The sealant layer 17 preferably has a thickness in the range of 10 to 100 μm, and more preferably 20 to 60 μm. The sealant layer 17 with a thickness of 20 μm or more achieves sufficient heat sealing strength. The sealant layer 17 with a thickness of 90 μm or less reduces the amount of water vapor penetration from an end of the packaging material.

[Method for Manufacturing Packaging Material]

A method for manufacturing the packaging material 10 will be described. The method for manufacturing the packaging material 10 is not limited to the following method.

For example, the method for manufacturing the packaging material 10 may be a method including the following steps S11 to S14 and manufacturing the packaging material 10 in order of S11, S12, S13, and S14.

Step S11: Forming the anticorrosion treatment layer 15a on a surface of a metal foil layer 14 and forming the corrosion inhibition treatment layer 15b on the other surface of the metal foil layer 14.

Step S12: Bonding a surface of the anticorrosion treatment layer 15a on a side opposite of the metal foil layer 14 to the substrate layer 11 via the adhesive layer 13.

Step S13: Forming the substrate protective layer 12 on a surface of the substrate layer 11 on a side opposite of the adhesive layer 13.

Step S14: Forming the sealant layer 17 on a surface of the anticorrosion treatment layer 15b on a side opposite of the metal foil layer 14 via the sealant adhesive layer 16.

(Step S11)

At step S11, the anticorrosion treatment layer 15a is formed on a surface of the metal foil layer 14 and the anticorrosion treatment layer 15b is formed on the other surface of the metal foil layer 14. The anticorrosion treatment layers 15a and 15b may be formed separately or simultaneously. Specifically, for example, an anticorrosion treatment agent (base material of the anticorrosion treatment layers) is applied to both surfaces of the metal foil layer 14, followed by drying, curing, and baking sequentially to simultaneously form the anticorrosion treatment layers 15a and 15b. Alternatively, an anticorrosion treatment agent may be applied to a surface of the metal foil layer 14, sequentially followed by drying, curing, and baking to form the anticorrosion treatment layer 15a. Then, the anticorrosion treatment layer 15b may be similarly formed on the other surface of the metal foil layer 14. The order of forming the anticorrosion treatment layers 15a and 15b is not limited. The anticorrosion treatment agent to be used may be different or the same between the anticorrosion treatment layers 15a and 15b. As the anticorrosion treatment agent, for example, one for coating type chromate treatment, or the like may be used. Examples of the method of applying the anticorrosion treatment agent include, but are not limited to, gravure coating, gravure reverse coating, roll coating, reverse roll coating, die coating, bar coating, kiss coating, comma coating, and small-diameter gravure coating. As the metal foil layer 14, an untreated metal foil layer may be used, or a metal foil layer subjected to wet or dry degreasing treatment may be used.

(Step S12)

At step S12, a surface of the anticorrosion treatment layer 15a on a side opposite of the metal foil layer 14 is bonded to the substrate layer 11 by dry lamination or the like using an adhesive forming the adhesive layer 13. In this case, the adhesive may be mixed with a pigment mentioned above so as to impart designability to the packaging material 10. At step S13, aging treatment may be performed at a temperature in the range of room temperature to 100° C. to accelerate adhesion. Aging time is, for example, 1 to 10 days.

(Step S13)

At step S13, the substrate protective layer 12 is formed on a surface of the substrate layer 11 on a side opposite of the adhesive layer 13. First, a coating agent is prepared by dissolving a raw material for forming the substrate protective layer 12 (a polyester resin or an acrylic resin) in a solvent. This coating agent is mixed with a polyisocyanate and other curing agents. Various stabilizers, such as leveling agents and antifoaming agents, may be mixed in order to impart coating stability. Moreover, various catalyst may be mixed in order to prevent blocking after coating, and to promote the reaction of the coating agent. Furthermore, reaction retardants (e.g., acetylacetone) may be mixed in order to control the pot life of the coating agent.

Then, the coating agent is applied to the substrate layer 11 using a known method, and dried by heating. Examples of such a coating method include gravure direct coating, gravure reverse coating (direct coating, kiss coating), bar coater coating, small-diameter gravure coating, and the like. When the filler mentioned above is mixed, a slurry prepared by previously dispersing the filler in a solvent may be mixed with a resin varnish, or the filler may be directly dispersed in an already resin varnish coating agent. It is also possible to mix other additives, such as a curing agent, into these filler-mixed liquids. The timing of forming the substrate protective layer 12 is not limited to the present embodiment.

(Step S14)

Following step S13, the sealant layer 17 is formed, via the sealant adhesive layer 16, on a surface of the anticorrosion treatment layer 15b on a side opposite of the metal foil layer 14, in the laminate having the substrate protective layer 12, the substrate layer 11, the adhesive layer 13, the anticorrosion treatment layer 15a, the metal foil layer 14, and the anticorrosion treatment layer 15b laminated in this order. The sealant layer 17 may be laminated by dry lamination, sandwich lamination, or the like, or may be laminated together with the sealant adhesive layer 16 by coextrusion. To improve adhesion, the sealant layer 17 is preferably laminated by, for example, sandwich lamination or laminated together with the sealant adhesive layer 16 by coextrusion, and is more preferably laminated by a co-extrusion method.

The packaging material 10 is obtained through the steps S11 to S14 described above. The order of steps in the method for manufacturing the packaging material 10 is not limited to that of the above method where steps S11 to S14 are sequentially performed. The order of steps may be appropriately changed. For example, step S12 may be followed by step S11.

[Power Storage Device]

A power storage device provided with the packaging material 10 as a container will be described. The power storage device includes a battery element 1 including electrodes, leads 2 extending from the electrodes, and a container holding the battery element 1. The container is formed of the packaging material 10 for a power storage device, with the sealant layer 17 inside. The container may be obtained by overlapping two packaging materials with the sealant layers 17 face-to-face, and heat-sealing the edge portions of the overlapped packaging materials 10, or may be obtained by folding a single packaging material so that the surfaces are overlapped with each other and similarly heat-sealing the edge portions of the packaging material 10. The power storage device may have the packaging material 20 as a container. The packaging material of the present embodiment can be used for various power storage devices. Examples of the power storage device include secondary batteries, such as lithium ion batteries, nickel hydride batteries, and lead batteries, and electrochemical capacitors, such as electric double layer capacitors.

The leads 2 are sandwiched and hermetically sealed by the packaging material 10 forming the container with the sealant layer 17 inside. The leads 2 may be sandwiched by the packaging material 10 via a tab sealant.

[Method for Manufacturing Power Storage Device]

Figure 2A:
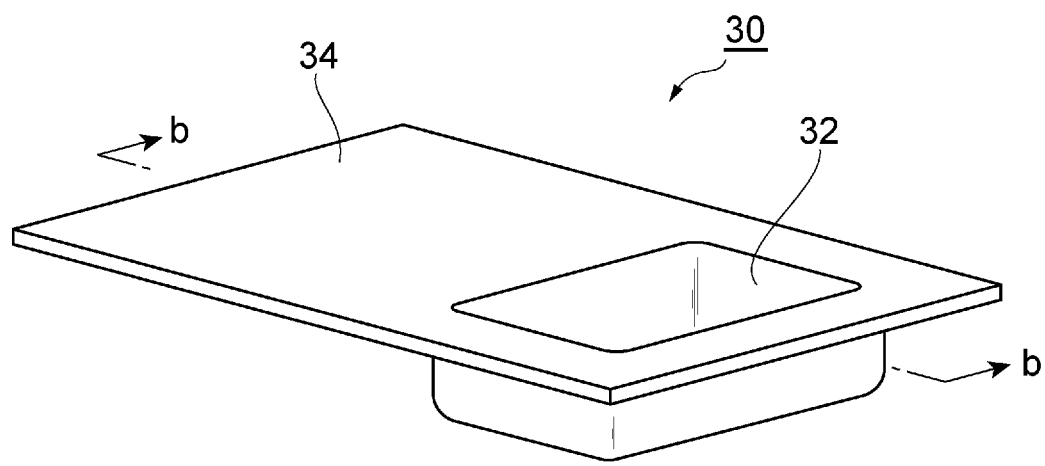
FIGS. 2A and 2B are a set of diagrams illustrating an embossed packaging material obtained using the power storage device packaging material according to an embodiment of the present invention, with FIG. 2A being a perspective view of the embossed packaging material, and FIG. 2B being a vertical cross-sectional view of the embossed packaging material shown in FIG. 2A taken along the line b-b.
Figure 2B:
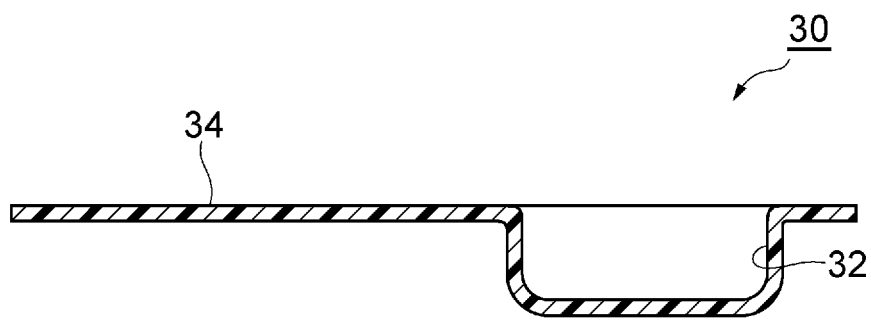
Figure 3A:
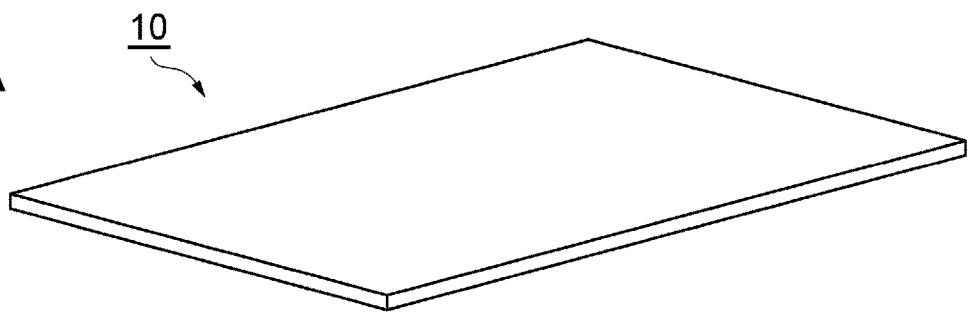
FIGS. 3A, 3B, 3C, and 3D are a set of diagrams illustrating in perspective a process of producing a secondary battery using the power storage device packaging material according to an embodiment of the present invention, with FIG. 3A showing the power storage device packaging material, FIG. 3B showing the power storage device packaging material that has been embossed, and a battery element, FIG. 3C showing the power storage device packaging material that has been folded with an end portion being heat-sealed, and FIG. 3D showing a state in which both sides of the folded portion are turned up.
Figure 3B:
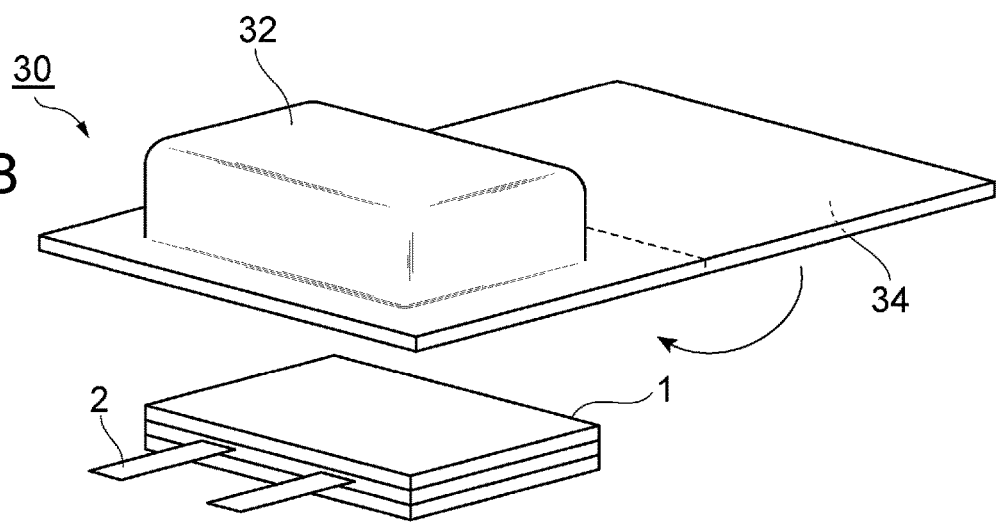
Figure 3C:
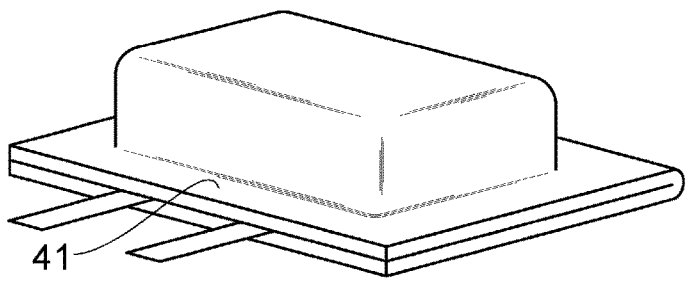
Figure 3D:
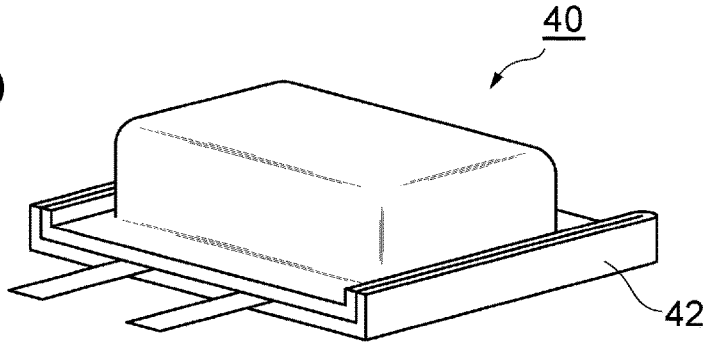

A method for manufacturing the power storage device using the packaging material 10 will be described. The description herein is given taking as an example of the case of producing a secondary battery 40 using an embossed packaging material 30. FIGS. 2A and 2B show a set of diagrams each illustrating the embossed packaging material 30. FIGS. 3A, 3B, 3C, and 3D show a set of diagrams, each being a perspective view of a production procedure of a single-sided battery using the packaging material 10. The secondary battery 40 may be a double-sided battery produced by providing two packaging materials similar to the embossed packaging material 30, and bonding the packaging materials to each other while alignment is adjusted. The embossed packaging material 30 may be formed using a packaging material 20.

The secondary battery 40, which is a single-sided battery, can be produced through steps S21 to S26 below, for example.

Step S21: Preparing the packaging material 10, the battery element 1 including electrodes, and the leads 2 extending from the electrodes.

Step S22: Forming a recess 32 for disposing the battery element 1 therein on a surface of the packaging material 10 (see FIG. 3A and FIG. 3B).

Step S23: Disposing the battery element 1 in the shaped area (recess 32) of the embossed packaging material 30, folding the embossed packaging material 30, with the surfaces being overlapped, so as to cover the recess 32 with a cover portion 34, and pressure heat-sealing one side of the embossed packaging material 30 so as to sandwich the leads 2 extending from the battery element 1 (see FIG. 3B and FIG. 3C).

Step S24: Pressure heat-sealing other sides, leaving the side sandwiching the leads 2 unsealed, followed by injecting an electrolyte solution from the unsealed side and pressure heat-sealing the unsealed side in a vacuum (see FIG. 3C).

Step S25: Performing charging and discharging while setting the current value, voltage value, environmental temperature, etc., to predetermined values to induce chemical changes (chemical conversion).

Step S26: Trimming the end portions of the pressure heat-sealed sides except for the side sandwiching the leads 2, and bending the end portions toward the shaped area (recess 32) (see FIG. 3D).

(Step S21)

At step S21, the packaging material 10, the battery element 1 including electrodes, and the leads 2 extending from the electrodes are prepared. The packaging material 10 is prepared based on the embodiment described above. The battery element 1 and the leads 2 are not limited, but a known battery element 1 and known leads 2 may be used.

(Step S22)

At step S22, the recess 32 for arranging the battery element 1 is formed on the sealant layer 17 side of the packaging material 10. The recess 32 has a shape, such as a rectangular shape in plan view, conforming to the shape of the battery element 1. The recess 32 is formed by, for example, pressing a pressing member having a rectangular pressing surface against part of the packaging material 10 in the thickness direction thereof. The position to be pressed, that is, the recess 32, is formed in a position deviated to an end portion of the packaging material 10 in a longitudinal direction from the center of the packaging material 10 cut in a rectangle. Thus, the other end portion having no recess 32 is folded after forming to provide a cover (cover portion 34).

More specifically, the method of forming the recess 32 may be a method using a die (deep drawing). The molding method may be one that uses a negative die and a positive die arranged with a gap equal to or greater than the thickness of the packaging material 10 therebetween, so that the positive die is pressed into the negative die together with the packaging material 10. By adjusting the pressing of the positive die, the depth (deep drawing degree) of the recess 32 can be adjusted as desired. With the recess 32 being formed in the packaging material 10, the embossed packaging material 30 is obtained. The embossed packaging material 30 has a shape, for example, as illustrated in FIGS. 2A and 2B. FIG. 2A shows a perspective view of the embossed packaging material 30, and FIG. 2B is a longitudinal cross-sectional view of the embossed packaging material 30 shown in FIG. 2A taken along the line b-b.

(Step S23)

At step S23, the battery element 1 including a cathode, a separator, an anode, and the like is arranged in the shaped area (recess 32) of the embossed packaging material 30. The leads 2 extending from the battery element 1 and respectively joined to the cathode and the anode are drawn out of the molding area (recess 32). The embossed packaging material 30 is then folded at the approximate center thereof in the longitudinal direction so that the surfaces of the sealant layer 17 are located on the inward side and overlapped with each other, followed by pressure heat-sealing the side of the embossed packaging material 30 sandwiching the leads 2. The pressure heat sealing is controlled by three conditions of temperature, pressure, and time, which are appropriately set. The pressure heat sealing is preferably performed at a temperature of not less than a temperature fusing the sealant layer 17.

The thickness of the sealant layer 17 before being heat-sealed is preferably in the range of 40% or more and 80% or less relative to the thickness of the leads 2. With the thickness of the sealant layer 17 being not less than the lower limit, the heat-sealing resin is likely to sufficiently fill the end portions of the leads 2. With the thickness of the sealant layer 17 being not more than the upper limit, the thickness of the end portions of the packaging material 10 of the secondary battery 40 can have a moderate thickness, reducing the amount of moisture penetrating from the end portions of the packaging material 10.

(Step S24)

At step S24, the sides of the packaging material are pressure heat-sealed, leaving the side sandwiching the leads 2 unsealed. An electrolyte is then injected from the unsealed side which is then pressure heat-sealed in vacuum. The pressure heat-sealing conditions are similar to those at step S23.

(Step S25)

At step S25, the secondary battery 40 obtained until step S23 is charged and discharged to induce chemical changes (chemical conversion: for 3 days in 40° C. environment). Then, the secondary battery 40 is once opened to remove gas generated by chemical conversion and refill the electrolyte. Thereafter, final sealing is performed. Step S25 can be omitted.

(Step S26)

The end portions of the peripheral pressure heat-sealed sides except for the side sandwiching the leads 2 are trimmed and the sealant layer 17 squeezed out of the end portions is removed. The peripheral pressure heat-sealed portions are then turned up toward the shaped area 32 to form turn-up portions 42, thereby obtaining the secondary battery 40.

Preferred embodiments of the method for manufacturing the power storage device packaging material and the method for manufacturing the power storage device of the present invention have so far been described in detail. However, the present invention should not be construed as being limited to these specific embodiments, but may be variously modified and changed within the range of the spirit of the present invention recited in the claims.

EXAMPLES

In the following, the present invention will be described in more detail by way of Examples. As an example of the packaging material for a power storage device, a packaging material for a lithium ion battery is exemplified; however, the present invention should not be limited to the following Examples.

Example A1

In Example A1, a packaging material 10 for a lithium ion battery was produced in the following manner. First, as the metal foil layer 14, soft aluminum foil 8079 having a thickness of 35 μm (manufactured by Toyo Aluminium K.K.) was used. A sodium polyphosphate-stabilized cerium oxide sol (anticorrosion treatment agent) was applied to both surfaces of the metal foil layer 14 by gravure coating. The sol was prepared using distilled water as a solvent and controlled to have a solid content concentration of 10 mass %. The sol contained 10 parts by mass of phosphoric acid, relative to 100 parts by mass of cerium oxide.

Then, the applied sodium polyphosphate-stabilized cerium oxide sol was dried and successively baked to form the anticorrosion treatment layer 15a on a surface of the metal foil treatment 14 and the anticorrosion treatment layer 15b on the other surface. In this case, the sol was baked at a temperature of 150° C. and for a treatment time of 30 seconds.

Then, both surfaces of a nylon film, serving as the substrate layer 11, were corona-treated.

Then, a polyurethane-based adhesive was applied, as the adhesive layer 13, to a surface of the anticorrosion treatment layer 15a on a side opposite of the metal foil layer 14. Then, the metal foil layer 14 was adhered to the corona-treated surface of the substrate layer 11 via the adhesive layer 13 by dry lamination. After that, the structure made up of the substrate layer 11, the adhesive layer 13, the anticorrosion treatment layer 15a, the metal foil layer 14, and the anticorrosion treatment layer 15b was left standing in atmospheric air at 60° C. temperature for 6 days for aging treatment.

Subsequently, a coating liquid for forming a substrate protective layer was prepared, and applied to a surface of the substrate layer 11 on a side opposite of the adhesive layer 13, followed by drying, thereby forming a substrate protective layer 12 having a thickness of 3 μm. The coating liquid for forming a substrate protective layer was prepared in the following manner. Specifically, a curing agent (a 99/1 mixture of an adduct form of hexamethylene diisocyanate (HDI-A) as the isocyanate other than an alicyclic isocyanate, and an isocyanurate form of isophorone diisocyanate as the alicyclic isocyanate) was mixed in a resin varnish (polyester polyol) coating agent. The amount of the curing agent mixed was set so that the ratio ([B]/[A]) of the number of moles of reactive groups of the curing agent [B] to the number of moles of hydroxyl groups of the polyester resin [A] was 50.

Then, the sealant adhesive layer 16 was formed by co-extruding maleic anhydride-modified polypropylene (trade name: ADMER, manufactured by Mitsui Chemicals, Inc.) serving as a base material of the sealant adhesive layer 16 and polypropylene as the sealant layer 17 on a surface of the anticorrosion treatment layer 15b on a side opposite of the metal foil layer 14, followed by bonding (heat-pressure bonding) at 180° C. (pattern 2). The sealant adhesive layer 16 was ensured to have a thickness of 15 μm, and the sealant layer 17 was ensured to have a thickness of 20 μm. A packaging material 10 for a lithium ion battery was produced in this manner.

Other Examples and Comparative Examples

Packaging materials 10 for lithium ion batteries were produced in the same manner as in Example A1, except that the substrate protective layer compositions and the structural patterns shown in Tables 1 and 2 were used. In Tables 1 and 2, "-A" at the end in the curing agent type column represents an adduct form, and "-N" at the end represents an isocyanurate form. In some Examples, packaging materials were produced while changing the procedure as shown below.

Examples A12 to A14, A16, and A18

A filler was mixed with a resin varnish.
"Silica": 7.8 mass %, mean particle size: 2.7 μm
"Urethane": 7.0 mass %, mean particle size: 3 μm
"Acrylic": 7.0 mass %, mean particle size: 6 μm Examples A15 to A18

In place of forming the anticorrosion treatment layers 15a and 15b using the sodium polyphosphate-stabilized cerium oxide sol, the anticorrosion treatment layers 15a and 15b were formed by performing chromate treatment by applying a treatment liquid containing a phenol resin, a chromium fluoride compound, and phosphoric acid to both surfaces of the metal foil layer 14 to form a coating, and baking the coating. Packaging materials 10 for lithium ion batteries were produced in the same manner as in Example A1 except for this procedure.

Examples A17 and A18

A polyurethane-based adhesive was applied to a surface of the anticorrosion treatment layer 15b on a side opposite of the metal foil layer 14. The polyurethane-based adhesive was prepared by mixing a polyisocyanate with an acid-modified polyolefin dissolved in a mixed solvent of toluene and methylcyclohexane. Then, a polyolefin film with a thickness of 30 μm (non-stretched polypropylene film having a sealant adhesive layer 16 side corona-treated surface) serving as the sealant layer 17 was bonded to the metal foil layer 14 via the sealant adhesive layer 16 by dry lamination. After that, the structure made up of the substrate layer 11, the adhesive layer 13, the anticorrosion treatment layer 15a, the metal foil layer 14, the anticorrosion treatment layer 15b, the sealant adhesive layer 16, and the sealant layer 17 was left standing in atmospheric air at 40° C. temperature for 6 days for aging treatment. Packaging materials 10 for lithium ion batteries were produced in the same manner as in Example A1 except for this procedure (pattern 1).

TABLE 1

| | Substrate protective layer composition | | | | | | | Structural pattern | |
|---|---|---|---|---|---|---|---|---|---|
| | Main agent | Curing agent [B] | | | | | | | |
| | Hydroxyl group [A] | Type | Curing agent (a) | Curing agent (b) | (a)/(b) | [B]/[A] | Filler | Structure | Anticorrosion treatment |
| Comparative Example A1 | | | None | | | | | Pattern 2 | Ceria |
| Comparative Example A2 | 50 | Polyester | HDI-A | — | — | 1.5 | — | Pattern 2 | Ceria |
| Comparative Example A3 | 50 | Polyester | HDI-A | — | — | 3.5 | — | Pattern 2 | Ceria |
| Comparative Example A4 | 50 | Polyester | HDI-A | — | — | 6 | — | Pattern 2 | Ceria |
| Comparative Example A5 | 50 | Polyester | HDI-A | — | — | 25 | — | Pattern 2 | Ceria |
| Comparative Example A6 | 50 | Polyester | HDI-A | — | — | 50 | — | Pattern 2 | Ceria |
| Comparative Example A7 | 50 | Polyester | HDI-A | — | — | 60 | — | Pattern 2 | Ceria |
| Comparative Example A8 | 50 | Polyester | HDI-A | — | — | 80 | — | Pattern 2 | Ceria |
| Comparative Example A9 | 50 | Polyester | HDI-A | IPDI-N | 99.5/0.5 | 50 | — | Pattern 2 | Ceria |
| Comparative Example A10 | 50 | Polyester | HDI-A | IPDI-N | 99.2/0.8 | 50 | — | Pattern 2 | Ceria |
| Example A1 | 50 | Polyester | HDI-A | IPDI-N | 99.0/1.0 | 50 | — | Pattern 2 | Ceria |
| Example A2 | 50 | Polyester | HDI-A | IPDI-N | 98.0/2.0 | 50 | — | Pattern 2 | Ceria |
| Example A3 | 50 | Polyester | HDI-A | IPDI-N | 95.0/5.0 | 50 | — | Pattern 2 | Ceria |
| Example A4 | 50 | Polyester | HDI-A | IPDI-N | 90.0/10.0 | 50 | — | Pattern 2 | Ceria |
| Example A5 | 50 | Polyester | HDI-A | IPDI-N | 80.0/20.0 | 50 | — | Pattern 2 | Ceria |

TABLE 2

| | Substrate protective layer composition | | | | | | | Structural pattern | |
|---|---|---|---|---|---|---|---|---|---|
| | Main agent | | Curing agent [B] | | | | | | |
| | Hydroxy group [A] | Type | Curing agent (a) | Curing agent (b) | (a)/(b) | [B]/[A] | Filler | Structure | Anticorrosion treatment |
| Comparative Example A11 | 50 | Polyester | HDI-A | IPDI-N | 75.0/25.0 | 50 | — | Pattern 2 | Ceria |
| Comparative Example A12 | 50 | Polyester | HDI-A | IPDI-N | 50.0/50.0 | 50 | — | Pattern 2 | Ceria |
| Example A6 | 50 | Polyester | HDI-A | IPDI-N | 98.0/2.0 | 80 | — | Pattern 2 | Ceria |
| Example A7 | 25 | Polyester | HDI-A | IPDI-N | 98.0/2.0 | 50 | — | Pattern 2 | Ceria |
| Example A8 | 5 | Polyester | HDI-A | IPDI-N | 98.0/2.0 | 50 | — | Pattern 2 | Ceria |
| Example A9 | 3 | Polyester | HDI-A | IPDI-N | 98.0/2.0 | 50 | — | Pattern 2 | Ceria |
| Example A10 | 3 | Polyester | HDI-A | IPDI-N | 98.0/2.0 | 6 | — | Pattern 2 | Ceria |
| Example A11 | 50 | Polyester | TDI-A | IPDI-N | 98.0/2.0 | 50 | — | Pattern 2 | Ceria |
| Example A12 | 50 | Polyester | HDI-A | IPDI-N | 98.0/2.0 | 50 | Silica | Pattern 2 | Ceria |
| Example A13 | 50 | Polyester | HDI-A | IPDI-N | 98.0/2.0 | 50 | Urethane | Pattern 2 | Ceria |
| Example A14 | 50 | Polyester | HDI-A | IPDI-N | 98.0/2.0 | 50 | Acrylic | Pattern 2 | Ceria |
| Example A15 | 50 | Polyester | HDI-A | IPDI-N | 98.0/2.0 | 50 | — | Pattern 2 | Chromium |
| Example A16 | 50 | Polyester | HDI-A | IPDI-N | 98.0/2.0 | 50 | Silica | Pattern 2 | Chromium |
| Example A17 | 50 | Polyester | HDI-A | IPDI-N | 98.0/2.0 | 50 | — | Pattern 1 | Chromium |
| Example A18 | 50 | Polyester | HDI-A | IPDI-N | 98.0/2.0 | 50 | Silica | Pattern 1 | Chromium |

TABLE 3

| | Performance | | | | | | | |
|---|---|---|---|---|---|---|---|---|
| | PSA adhesion | | | Evaluation of electrolyte resistance | Evaluation of alcohol resistance | Evaluation of substrate adhesion | Formability | |
| | Strength | Separated surface | Evaluation | | | | Drawing depth | Evaluation |
| Comparative Example A1 | 6.5N | Between PSA/Al | A | C | — | — | 4.00 mm | A |
| Comparative Example A2 | 4.5N | Between protective layer/PSA | C | C | C | C | 2.50 mm | C |
| Comparative Example A3 | 4.2N | Between protective layer/PSA | C | C | C | C | 2.50 mm | C |
| Comparative Example A4 | 4.2N | Between protective layer/PSA | C | B | B | B | 3.00 mm | B |
| Comparative Example A5 | 4.6N | Between protective layer/PSA | C | A | A | A | 3.50 mm | A |
| Comparative Example A6 | 4.8N | Between protective layer/PSA | C | A | A | A | 3.50 mm | A |
| Comparative Example A7 | 4.2N | Between protective layer/PSA | C | A | A | A | 3.50 mm | A |
| Comparative Example A8 | 4.5N | Between protective layer/PSA | C | A | A | A | 1.50 mm | C |
| Comparative Example A9 | 5.2N | Between protective layer/PSA | C | A | A | A | 3.50 mm | A |
| Comparative Example A10 | 5.6N | Between protective layer/PSA | C | A | A | A | 3.50 mm | A |

TABLE 3-continued

| | PSA adhesion | | | Performance | | | Formability | |
|---|---|---|---|---|---|---|---|---|
| | Strength | Separated surface | Evaluation | Evaluation of electrolyte resistance | Evaluation of alcohol resistance | Evaluation of substrate adhesion | Drawing depth | Evaluation |
| Example A1 | 6.2N | Between protective layer/PSA | B | A | A | A | 3.50 mm | A |
| Example A2 | 6.7N | Between PSA/Al | A | A | A | A | 3.50 mm | A |
| Example A3 | 6.6N | Between PSA/Al | A | A | A | A | 3.50 mm | A |
| Example A4 | 6.6N | Between PSA/Al | A | A | A | A | 3.50 mm | A |
| Example A5 | 6.8N | Between PSA/Al | A | A | A | A | 3.50 mm | A |

TABLE 4

| | PSA adhesion | | | Performance | | | Formability | |
|---|---|---|---|---|---|---|---|---|
| | Strength | Separated surface | Evaluation | Evaluation of electrolyte resistance | Evaluation of alcohol resistance | Evaluation of substrate adhesion | Drawing depth | Evaluation |
| Comparative Example A11 | 6.7N | Between PSA/Al | A | C | C | A | 3.50 mm | A |
| Comparative Example A12 | 6.5N | Between PSA/Al | A | C | C | A | 3.50 mm | A |
| Example A6 | 6.5N | Between PSA/Al | A | A | A | A | 1.50 mm | C |
| Example A7 | 6.4N | Between PSA/Al | A | A | A | A | 3.00 mm | B |
| Example A8 | 6.5N | Between PSA/Al | A | A | A | A | 3.00 mm | B |
| Example A9 | 6.7N | Between PSA/Al | A | B | B | B | 3.00 mm | B |
| Example A10 | 6.5N | Between PSA/Al | A | B | B | B | 3.00 mm | B |
| Example A11 | 6.7N | Between PSA/Al | A | B | A | A | 3.50 mm | A |
| Example A12 | 6.4N | Between PSA/Al | A | A | A | A | 3.75 mm | A |
| Example A13 | 6.4N | Between PSA/Al | A | A | A | A | 3.75 mm | A |
| Example A14 | 6.3N | Between PSA/Al | A | A | A | A | 3.75 mm | A |
| Example A15 | 6.6N | Between PSA/Al | A | B | A | A | 3.50 mm | A |
| Example A16 | 6.6N | Between PSA/Al | A | A | A | A | 3.75 mm | A |
| Example A17 | 6.5N | Between PSA/Al | A | B | A | A | 3.50 mm | A |
| Example A18 | 6.6N | Between PSA/Al | A | A | A | A | 3.75 mm | A |

The meaning of the terms in Tables 1 and 2 is as follows.
HDI: hexamethylene diisocyanate
TDI: tolylene diisocyanate
IPDI: isophorone diisocyanate
Pattern 1: dry laminate structure
Pattern 2: thermal laminate structure
Ceria: anticorrosion treatment using sodium polyphosphate-stabilized cerium oxide sol
Chromium: chromate anticorrosion treatment <Evaluation of Adhesion to Adhesive Tape>

The packaging material was fixed to an acrylic plate so that the substrate protective layer was the upper surface. A pressure-sensitive adhesive (PSA) tape having a length of 100 mm and a width of 15 mm, and support aluminum foil for peel test having a length of 100 mm and a width of 25 mm were fixed to the substrate protective layer side using a roller with a load of 1 kg. After the resultant was allowed to stand at room temperature for 12 hours, the laminate strength (180-degree separation, separation rate: 50 mm/min) between the packaging material and the PSA tape was measured, and the interface in which separation occurred was confirmed. Tables 3 and 4 show the results.
  A: The strength was 6 N/15 mm or more, and separation occurred between PSA/A1.
  B: The strength was 6 N/15 mm or more, and separation occurred between surfaces other than PSA/A1.
  C: The strength was less than 6 N/15 mm.
  <Evaluation of Electrolyte Resistance>
  An electrolyte (ethylene carbonate/dimethyl carbonate/diethyl carbonate=1:1:1 wt %, $LiPF_6$, 1 M) was added dropwise to the coating layer of each of the packaging materials obtained in the Examples and Comparative Examples, and wiped with isopropyl alcohol after a predetermined period of time elapsed. Thereafter, the appearance of the dropping part was evaluated according to the following criteria. Tables 3 and 4 show the results.
  A: The electrolyte-dropping part was not recognized after 15 minutes.
  B: The electrolyte-dropping part was not recognized after 10 minutes, but ring stain appeared after 15 minutes.
  C: The electrolyte-dropping part was not recognized after 5 minutes, but ring stain appeared after 10 minutes.
  <Evaluation of Alcohol Resistance>
  A 1-cm square cotton infiltrated with ethanol was applied to the coating layer of each of the packaging materials obtained in the Examples and Comparative Examples, and rubbed at a constant speed while applying a load of 500 g onto the cotton (alcohol rubbing method). After rubbing was repeated for a predetermined number of times, the occurrence of peeling of the coating film was evaluated according to the following criteria. Tables 3 and 4 show the results.
  A: No peeling occurred even after rubbing was repeated 20 times or more.
  B: No peeling occurred after rubbing was repeated 15 times, but peeling occurred after rubbing was repeated 20 times.
  C: No peeling occurred after rubbing was repeated 10 times, but peeling occurred after rubbing was repeated 15 times.
  <Evaluation of Adhesion>
  Using the packaging materials obtained in the Examples and Comparative Examples, the adhesion between the substrate layer 11 and the substrate protective layer 12 was evaluated in the following manner. Eleven cuts were made on a test surface using a cutter knife so that the interval of the cuts that reached the substrate was 1 mm, thereby forming 100 squares. Then, a cellophane tape was strongly bonded by pressure to the squares, and the end of the tape was peeled off at one stroke at an angle of 90°. The number of squares from which the coating film was not peeled was visually counted among the 100 squares, and evaluated. Tables 3 and 4 show the results.
  A: 100 squares were OK
  B: 90 to 80 squares were OK
  C: Less than 80 squares were OK
  <Evaluation of Drawing Depth>
  For the packaging materials obtained in the Examples and Comparative Examples, drawing depth of deep drawing was evaluated by the following method. First, each packaging material 10 for a lithium ion battery was arranged in a forming apparatus with the sealant layer 17 facing upward. Forming depth of the forming apparatus was set to a rate of 1.0 to 7.0 mm per 0.5 mm and the packaging material was cold-formed in an environment of 23° C. room temperature and −35° C. dew point temperature. The punch die used had a rectangular transverse cross-section of 70 mm×80 mm, a bottom with 1.00 mm punch radius (RP), and a side face with 1.00 mm punch corner radius (RCP). The die used had an opening top with 1.00 mm die radius (RD). The presence/absence of breakage and pinholes in the cold-formed area was visually checked by irradiating the packaging material with light to thereby evaluate the maximum value of the drawing depth in which deep drawing was possible without causing breakage or pinholes. Moreover, the drawing depth was evaluated according to the following criteria. Tables 3 and 4 show the results.
  A: The difference from when the substrate protective layer was not provided (Comparative Example A1) was 0.75 mm or less.
  B: The difference from when the substrate protective layer was not provided was more than 0.75 mm and 1.25 mm or less.
  C: The difference from when the substrate protective layer was not provided was more than 1.25 mm.
  The above experimental results demonstrate, for example, the following.
  When the ratio ([a]/[b]) of the weight of the isocyanate other than an alicyclic isocyanate [a] to the weight of the alicyclic isocyanate [b] is 99/1 to 80/20, PSA adhesion, electrolyte resistance, and alcohol resistance are good.
  In order to improve formability, the ratio ([B]/[A]) of the number of moles of reactive groups of the curing agent [B] to the number of moles of hydroxyl groups of the polyester polyol [A] is preferably less than 80 (comparison between Example A2 and Example A6).
  When a filler is mixed, formability tends to be improved (comparison between Example A2 and Examples A12 to A14).

Reference Example B1

In Reference Example B1, a packaging material 10 for a lithium ion battery was produced in the following manner. First, as the metal foil layer 14, soft aluminum foil 8079 having a thickness of 35 μm (manufactured by Toyo Aluminium K.K.) was used. A sodium polyphosphate-stabilized cerium oxide sol (anticorrosion treatment agent) was applied to both surfaces of the metal foil layer 14 by gravure coating. The sol was prepared using distilled water as a solvent and controlled to have a solid content concentration of 10 mass %. The sol contained 10 parts by mass of phosphoric acid, relative to 100 parts by mass of cerium oxide.

Then, the applied sodium polyphosphate-stabilized cerium oxide sol was dried and successively baked to form the anticorrosion treatment layer 15a on a surface of the metal foil treatment 14 and the anticorrosion treatment layer 15b on the other surface. In this case, the sol was baked at a temperature of 150° C. and for a treatment time of 30 seconds.

Then, both surfaces of a nylon film, serving as the substrate layer 11, were corona-treated.

Then, a polyurethane-based adhesive was applied, as the adhesive layer 13, to a surface of the anticorrosion treatment layer 15a on a side opposite of the metal foil layer 14. Then, the metal foil layer 14 was adhered to the corona-treated surface of the substrate layer 11 via the adhesive layer 13 by dry lamination. After that, the structure made up of the substrate layer 11, the adhesive layer 13, the anticorrosion treatment layer 15a, the metal foil layer 14, and the anticorrosion treatment layer 15b was left standing in atmospheric air at 60° C. temperature for 6 days for aging treatment.

Subsequently, a coating liquid for forming a substrate protective layer was prepared, and applied to a surface of the substrate layer 11 on a side opposite of the adhesive layer 13, followed by drying, thereby forming a substrate protective layer 12 having a thickness of 3 μm. The coating liquid for forming a substrate protective layer was prepared in the following manner. Specifically, a curing agent (an adduct form of tolylene diisocyanate (TDI-A) as the aromatic isocyanate compound) was mixed in a resin varnish (polyester polyol) coating agent.

Then, the sealant adhesive layer 16 was formed by co-extruding maleic anhydride-modified polypropylene (trade name: ADMER, manufactured by Mitsui Chemicals, Inc.) serving as a base material of the sealant adhesive layer 16 and polypropylene as the sealant layer 17 on a surface of the anticorrosion treatment layer 15b on a side opposite of the metal foil layer 14, followed by bonding (heat-pressure bonding) at 180° C. (pattern 2). The sealant adhesive layer 16 was ensured to have a thickness of 15 μm, and the sealant layer 17 was ensured to have a thickness of 20 μm. A packaging material 10 for a lithium ion battery was produced in this manner.

Other Reference Examples, Examples, and Comparative Examples

Packaging materials 10 for lithium ion batteries were produced in the same manner as in Reference Example B1, except that the substrate protective layer compositions and the structural patterns shown in Tables 5 and 6 were used. In Tables 5 and 6, "-A" at the end in the curing agent type column represents an adduct form, and "-N" at the end represents an isocyanurate form. In some Examples, packaging materials were produced while changing the procedure as shown below.

Examples B32 to B34, B36, and B38

A filler was mixed with a resin varnish.
"Silica": 7.8 mass %, mean particle size: 2.7 μm
"Urethane": 7.0 mass %, mean particle size: 3 μm
"Acrylic": 7.0 mass %, mean particle size: 6 μm Examples B35 to B38

In place of forming the anticorrosion treatment layers 15a and 15b using the sodium polyphosphate-stabilized cerium oxide sol, the anticorrosion treatment layers 15a and 15b were formed by performing chromate treatment by applying a treatment liquid containing a phenol resin, a chromium fluoride compound, and phosphoric acid to both surfaces of the metal foil layer 14 to form a coating, and baking the coating. Packaging materials 10 for lithium ion batteries were produced in the same manner as in Example B1 except for this procedure.

Examples B37 and B38

A polyurethane-based adhesive was applied to a surface of the anticorrosion treatment layer 15b on a side opposite of the metal foil layer 14. The polyurethane-based adhesive was prepared by mixing a polyisocyanate with an acid-modified polyolefin dissolved in a mixed solvent of toluene and methylcyclohexane. Then, a polyolefin film with a thickness of 30 μm (non-stretched polypropylene film having a sealant adhesive layer 16 side corona-treated surface) serving as the sealant layer 17 was bonded to the metal foil layer 14 via the sealant adhesive layer 16 by dry lamination. After that, the structure made up of the substrate layer 11, the adhesive layer 13, the anticorrosion treatment layer 15a, the metal foil layer 14, the anticorrosion treatment layer 15b, the sealant adhesive layer 16, and the sealant layer 17 was left standing in atmospheric air at 40° C. temperature for 6 days for aging treatment. Packaging materials 10 for lithium ion batteries were produced in the same manner as in Example B1 except for this procedure (pattern 1).

TABLE 5

| | Substrate protective layer composition | | | | | | | | | | | Structural pattern | |
|---|---|---|---|---|---|---|---|---|---|---|---|---|---|
| | Main agent | | | Curing agent [B] | | | | Tg of substrate protective layer | Thickness of substrate protective layer | Filler | Thickness of substrate protective layer/thickness of substrate layer | Structure | Anticorrosion treatment |
| | Hydroxyl group [A] | Type | Molecular weight | Curing agent (a) | Curing agent (b) | (a)/(b) | [B]/[A] | | | | | | |
| Comparative Example B1 | | | | None | | | | | | | | Pattern 2 | Ceria |
| Comparative Example B2 | 30 | Acrylic | 3000 | — | — | — | — | 60 | 10 μm | — | 67% | Pattern 2 | Ceria |
| Comparative Example B3 | 50 | Polyester | 3000 | — | — | — | — | 53 | 10 μm | — | 67% | Pattern 2 | Ceria |
| Reference Example B1 | 50 | Polyester | 3000 | TDI-A | — | — | 3 | 58 | 10 μm | — | 67% | Pattern 2 | Ceria |
| Reference Example B2 | 3 | Polyester | 15000 | TDI-A | — | — | 3 | 77 | 10 μm | — | 67% | Pattern 2 | Ceria |
| Reference Example B3 | 58 | Acrylic | 2500 | TDI-A | — | — | 3 | 63 | 10 μm | — | 67% | Pattern 2 | Ceria |
| Comparative Example B4 | 60 | Polyester | 1800 | TDI-A | — | — | 3 | 61 | 10 μm | — | 67% | Pattern 2 | Ceria |
| Comparative Example B5 | 4 | Polyester | 35000 | TDI-A | — | — | 3 | 56 | 10 μm | — | 67% | Pattern 2 | Ceria |
| Reference Example B4 | 3 | Polyester | 15000 | TDI-A | — | — | 5 | 150 | 10 μm | — | 67% | Pattern 2 | Ceria |

TABLE 5-continued

| | Substrate protective layer composition | | | | | | | | | | | | Structural pattern | |
|---|---|---|---|---|---|---|---|---|---|---|---|---|---|---|
| | Main agent | | | Curing agent [B] | | | | Tg of substrate protective layer | Thickness of substrate protective layer | | | Thickness of substrate protective layer/ thickness of substrate layer | | Anti-corrosion treatment |
| | Hydroxyl group [A] | Type | Molecular weight | Curing agent (a) | Curing agent (b) | (a)/(b) | [B]/[A] | | | Filler | | | Structure | |
| Reference Example B5 | 3 | Polyester | 15000 | TDI-A | — | — | 30 | 160 | 10 μm | — | 67% | | Pattern 2 | Ceria |
| Reference Example B6 | 3 | Polyester | 15000 | TDI-A | — | — | 60 | 170 | 10 μm | — | 67% | | Pattern 2 | Ceria |
| Reference Example B7 | 3 | Polyester | 15000 | TDI-A | — | — | 80 | 180 | 10 μm | — | 67% | | Pattern 2 | Ceria |
| Reference Example B8 | 3 | Polyester | 15000 | TDI-A | — | — | 5 | 150 | 10 μm | — | 67% | | Pattern 2 | Ceria |
| Reference Example B9 | 3 | Polyester | 15000 | TDI-A | — | — | 10 | 155 | 10 μm | — | 67% | | Pattern 2 | Ceria |
| Reference Example B10 | 3 | Polyester | 15000 | TDI-A | — | — | 20 | 160 | 10 μm | — | 67% | | Pattern 2 | Ceria |
| Example B11 | 3 | Polyester | 15000 | TDI-A | IPDI-N | 99.5/0.5 | 10 | 150 | 10 μm | — | 67% | | Pattern 2 | Ceria |
| Example B12 | 3 | Polyester | 15000 | TDI-A | IPDI-N | 99.2/0.8 | 10 | 150 | 10 μm | — | 67% | | Pattern 2 | Ceria |
| Example B13 | 3 | Polyester | 15000 | TDI-A | IPDI-N | 99.0/1.0 | 10 | 150 | 10 μm | — | 67% | | Pattern 2 | Ceria |
| Example B14 | 3 | Polyester | 15000 | TDI-A | IPDI-N | 97.0/3.0 | 10 | 150 | 10 μm | — | 67% | | Pattern 2 | Ceria |
| Example B15 | 3 | Polyester | 15000 | TDI-A | IPDI-N | 95.0/5.0 | 10 | 150 | 10 μm | — | 67% | | Pattern 2 | Ceria |
| Example B16 | 3 | Polyester | 15000 | TDI-A | IPDI-N | 90.0/10.0 | 10 | 150 | 10 μm | — | 67% | | Pattern 2 | Ceria |
| Example B17 | 3 | Polyester | 15000 | TDI-A | IPDI-N | 80.0/20.0 | 10 | 150 | 10 μm | — | 67% | | Pattern 2 | Ceria |
| Reference Example B18 | 3 | Polyester | 15000 | TDI-A | IPDI-N | 75.0/25.0 | 10 | 150 | 10 μm | — | 67% | | Pattern 2 | Ceria |
| Reference Example B19 | 3 | Polyester | 15000 | TDI-A | IPDI-N | 50.0/50.0 | 10 | 150 | 10 μm | — | 67% | | Pattern 2 | Ceria |

TABLE 6

| | Substrate protective layer composition | | | | | | | | | | Thickness of substrate protective layer/ thickness of substrate layer | Structural pattern | |
|---|---|---|---|---|---|---|---|---|---|---|---|---|---|
| | Main agent | | | Curing agent [B] | | | | Tg of substrate protective layer | Thickness of substrate protective layer | | | | Anti-corrosion treatment |
| | Hydroxyl group [A] | Type | Molecular weight | Curing agent (a) | Curing agent (b) | (a)/(b) | [B]/[A] | | | Filler | | Structure | |
| Example B20 | 3 | Polyester | 15000 | HDI-B | IPDI-N | 85/15 | 10 | 150 | 10 μm | — | 67% | Pattern 2 | Ceria |
| Example B21 | 5 | Polyester | 23000 | HDI-B | IPDI-N | 85/15 | 10 | 150 | 10 μm | — | 67% | Pattern 2 | Ceria |
| Example B22 | 50 | Polyester | 3000 | HDI-B | IPDI-N | 85/15 | 10 | 150 | 10 μm | — | 67% | Pattern 2 | Ceria |
| Example B23 | 70 | Polyester | 2200 | HDI-B | IPDI-N | 85/15 | 10 | 150 | 10 μm | — | 67% | Pattern 2 | Ceria |
| Example B24 | 100 | Polyester | 1800 | HDI-B | IPDI-N | 85/15 | 10 | 150 | 10 μm | — | 67% | Pattern 2 | Ceria |
| Example B25 | 50 | Polyester | 3000 | HDI-B | IPDI-N | 85/15 | 10 | 150 | 1 | — | 6.7% | Pattern 2 | Ceria |
| Example B26 | 50 | Polyester | 3000 | HDI-B | IPDI-N | 85/15 | 10 | 150 | 2 | — | 13.3% | Pattern 2 | Ceria |

TABLE 6-continued

| | Substrate protective layer composition | | | | | | | | | | Thickness of substrate protective layer/ thickness of substrate protective layer | Structural pattern | |
|---|---|---|---|---|---|---|---|---|---|---|---|---|---|
| | Main agent | | | Curing agent [B] | | | | Tg of substrate protective layer | Thickness of substrate protective layer | | | | |
| | Hydroxyl group [A] | Type | Molecular weight | Curing agent (a) | Curing agent (b) | (a)/(b) | [B]/[A] | | | Filler | | Structure | Anti-corrosion treatment |
| Example B27 | 50 | Polyester | 3000 | HDI-B | IPDI-N | 85/15 | 10 | 150 | 5 | — | 33.3% | Pattern 2 | Ceria |
| Example B28 | 50 | Polyester | 3000 | HDI-B | IPDI-N | 85/15 | 10 | 150 | 7 | — | 46.7% | Pattern 2 | Ceria |
| Example B29 | 50 | Polyester | 3000 | HDI-A | IPDI-N | 99.0/1.0 | 10 | 60 | 2 | — | 13.3% | Pattern 2 | Ceria |
| Example B30 | 50 | Polyester | 3000 | HDI-A | IPDI-N | 97.0/3.0 | 10 | 100 | 2 | — | 13.3% | Pattern 2 | Ceria |
| Example B31 | 50 | Polyester | 3000 | HDI-A | IPDI-N | 95.0/5.0 | 10 | 140 | 2 | — | 13.3% | Pattern 2 | Ceria |
| Example B32 | 50 | Polyester | 3000 | HDI-A | IPDI-N | 97.0/3.0 | 10 | 100 | 2 | Silica | 13.3% | Pattern 2 | Ceria |
| Example B33 | 50 | Polyester | 3000 | HDI-A | IPDI-N | 97.0/3.0 | 10 | 100 | 2 | Urethane | 13.3% | Pattern 2 | Ceria |
| Example B34 | 50 | Polyester | 3000 | HDI-A | IPDI-N | 97.0/3.0 | 10 | 100 | 2 | Acrylic | 13.3% | Pattern 2 | Ceria |
| Example B35 | 50 | Polyester | 3000 | HDI-A | IPDI-N | 97.0/3.0 | 10 | 100 | 2 | — | 13.3% | Pattern 2 | Chromium |
| Example B36 | 50 | Polyester | 3000 | HDI-A | IPDI-N | 97.0/3.0 | 10 | 100 | 2 | Silica | 13.3% | Pattern 2 | Chromium |
| Example B37 | 50 | Polyester | 3000 | HDI-A | IPDI-N | 97.0/3.0 | 10 | 100 | 2 | — | 13.3% | Pattern 1 | Chromium |
| Example B38 | 50 | Polyester | 3000 | HDI-A | IPDI-N | 97.0/3.0 | 10 | 100 | 2 | Silica | 13.3% | Pattern 1 | Chromium |

TABLE 7

| | Performance | | | | | | | | | | |
|---|---|---|---|---|---|---|---|---|---|---|---|
| | PSA adhesion | | | Evaluation of electrolyte resistance | Evaluation of alcohol resistance | Evaluation of substrate adhesion | Evaluation of insulating properties | Evaluation of resin solubility | Formability | | |
| | Strength | Separated surface | Evaluation | | | | | | Drawing depth | Evaluation | Delamination |
| Comparative Example B1 | 6.5N | Between PSA/Al | A | C | — | — | C | — | 4.00 mm | A | C |
| Comparative Example B2 | 2.9N | Between protective layer/PSA | C | C | C | C | C | A | 2.50 mm | C | C |
| Comparative Example B3 | 1.8N | Between protective layer/PSA | C | C | C | C | C | A | 2.50 mm | C | C |
| Reference Example B1 | 6.2N | Between protective layer/PSA | B | B | B | B | B | A | 2.75 mm | B | B |
| Reference Example B2 | 6.1N | Between protective layer/PSA | B | B | B | B | B | A | 2.75 mm | B | B |
| Reference Example B3 | 6.1N | Between protective layer/PSA | B | B | B | B | B | A | 2.75 mm | B | B |
| Comparative Example B4 | 6.1N | Between protective layer/PSA | B | C | C | C | B | A | 2.75 mm | B | B |
| Comparative Example B5 | 6.1N | Between protective layer/PSA | B | B | B | B | B | C | 2.75 mm | B | B |

TABLE 7-continued

| | PSA adhesion | | | Performance | | | | | | Formability | |
|---|---|---|---|---|---|---|---|---|---|---|---|
| | Strength | Separated surface | Evaluation | Evaluation of electrolyte resistance | Evaluation of alcohol resistance | Evaluation of substrate adhesion | Evaluation of insulating properties | Evaluation of resin solubility | Drawing depth | Evaluation | Delamination |
| Reference Example B4 | 6.3N | Between protective layer/PSA | B | A | A | A | B | A | 3.00 mm | B | B |
| Reference Example B5 | 6.4N | Between protective layer/PSA | B | A | A | A | B | A | 3.00 mm | B | B |
| Reference Example B6 | 6.1N | Between protective layer/PSA | B | A | A | A | B | A | 3.00 mm | B | B |
| Reference Example B7 | 6.4N | Between protective layer/PSA | B | A | A | A | B | A | 2.75 mm | B | B |
| Reference Example B8 | 6.4N | Between protective layer/PSA | B | A | A | A | A | A | 3.00 mm | A | B |
| Reference Example B9 | 6.2N | Between protective layer/PSA | B | A | A | A | A | A | 3.00 mm | A | B |
| Reference Example B10 | 6.2N | Between protective layer/PSA | B | A | A | A | A | A | 3.00 mm | A | B |
| Example B11 | 6.4N | Between protective layer/PSA | B | A | A | A | A | A | 3.25 mm | A | B |
| Example B12 | 6.6N | Between protective layer/PSA | B | A | A | A | A | A | 3.25 mm | A | B |
| Example B13 | 6.2N | Between PSA/Al | A | A | A | A | B | A | 3.25 mm | A | B |
| Example B14 | 6.7N | Between PSA/Al | A | A | A | A | B | A | 3.25 mm | A | B |
| Example B15 | 6.6N | Between PSA/Al | A | A | A | A | B | A | 3.25 mm | A | B |
| Example B16 | 6.6N | Between PSA/Al | A | A | A | A | B | A | 3.25 mm | A | B |
| Example B17 | 6.8N | Between PSA/Al | A | A | A | A | B | A | 3.25 mm | A | B |
| Reference Example B18 | 6.7N | Between PSA/Al | A | B | B | B | B | A | 3.25 mm | A | B |
| Reference Example B19 | 6.5N | Between PSA/Al | A | B | B | B | B | A | 3.25 mm | A | B |

TABLE 8

| | PSA adhesion | | | Performance | | | | | | Formability | |
|---|---|---|---|---|---|---|---|---|---|---|---|
| | Strength | Separated surface | Evaluation | Evaluation of electrolyte resistance | Evaluation of alcohol resistance | Evaluation of substrate adhesion | Evaluation of insulating properties | Evaluation of resin solubility | Drawing depth | Evaluation | Delamination |
| Example B20 | 6.7N | Between PSA/Al | A | S | S | A | A | A | 3.25 mm | A | B |
| Example B21 | 6.7N | Between PSA/Al | A | S | S | S | A | A | 3.25 mm | A | B |
| Example B22 | 6.8N | Between PSA/Al | A | S | S | S | A | A | 3.25 mm | A | B |
| Example B23 | 6.5N | Between PSA/Al | A | S | S | S | A | A | 3.25 mm | A | B |
| Example B24 | 6.7N | Between PSA/Al | A | S | S | S | A | A | 3.00 mm | A | B |
| Example B25 | 6.7N | Between PSA/Al | A | S | S | S | A | A | 3.25 mm | A | A |
| Example B26 | 6.4N | Between PSA/Al | A | S | S | S | A | A | 3.25 mm | A | A |

TABLE 8-continued

| | PSA adhesion | | | Performance | | | | | | | |
| | | | Evaluation | | | | Evaluation | | | Formability | |
| | | | of | Evaluation | Evaluation | Evaluation | of | Evaluation | | | |
| | | Separated | electrolyte | of alcohol | of substrate | insulating | of resin | Drawing | | |
| | Strength | surface | Evaluation | resistance | resistance | adhesion | properties | solubility | depth | Evaluation | Delamination |
|---|---|---|---|---|---|---|---|---|---|---|---|
| Example B27 | 6.8N | Between PSA/Al | A | S | S | S | A | A | 3.25 mm | A | A |
| Example B28 | 6.4N | Between PSA/Al | A | S | S | S | A | A | 3.00 mm | A | B |
| Example B29 | 6.7N | Between PSA/Al | A | S | S | S | A | A | 3.50 mm | A | A |
| Example B30 | 6.5N | Between PSA/Al | A | S | S | S | A | A | 3.50 mm | A | A |
| Example B31 | 6.7N | Between PSA/Al | A | S | S | S | A | A | 3.50 mm | A | A |
| Example B32 | 6.4N | Between PSA/Al | A | S | S | S | S | A | 3.75 mm | A | A |
| Example B33 | 6.6N | Between PSA/Al | A | S | S | S | S | A | 3.75 mm | A | A |
| Example B34 | 6.3N | Between PSA/Al | A | S | S | S | S | A | 3.75 mm | A | A |
| Example B35 | 6.6N | Between PSA/Al | A | S | S | S | S | A | 3.50 mm | A | A |
| Example B36 | 6.2N | Between PSA/Al | A | S | S | S | S | A | 3.75 mm | A | A |
| Example B37 | 6.3N | Between PSA/Al | A | S | S | S | S | A | 3.50 mm | A | A |
| Example B38 | 6.6N | Between PSA/Al | A | S | S | S | S | A | 3.75 mm | A | A |

The meaning of the terms in Tables 5 and 6 is as follows.
HDI-A: an adduct form of hexamethylene diisocyanate
TDI-A: an adduct form of tolylene diisocyanate
IPDI-N: an isocyanurate form of isophorone diisocyanate
Pattern 1: dry laminate structure
Pattern 2: thermal laminate structure
Ceria: anticorrosion treatment using sodium polyphosphate-stabilized cerium oxide sol
Chromium: chromate anticorrosion treatment <Evaluation of Adhesion to Adhesive Tape>

The packaging material was fixed to an acrylic plate so that the substrate protective layer was the upper surface. A pressure-sensitive adhesive (PSA) tape having a length of 100 mm and a width of 15 mm, and support aluminum foil for peel test having a length of 100 mm and a width of 25 mm were fixed to the substrate protective layer side using a roller with a load of 2 kg. After the resultant was allowed to stand at room temperature for 12 hours, the laminate strength (180-degree separation, separation rate: 50 mm/min) between the packaging material and the PSA tape was measured, and the interface in which separation occurred was confirmed. Tables 7 and 8 show the results.
  A: The strength was 6 N/15 mm or more, and separation occurred between PSA/Al.
  B: The strength was 6 N/15 mm or more, and separation occurred between surfaces other than PSA/Al.
  C: The strength was less than 6 N/15 mm.

<Evaluation of Electrolyte Resistance>

An electrolyte (ethylene carbonate/dimethyl carbonate/diethyl carbonate=1:1:1 wt %, $LiPF_6$, 1 M) was added dropwise to the coating layer of each of the packaging materials obtained in the Examples and Comparative Examples, and wiped with isopropyl alcohol after a predetermined period of time elapsed. Thereafter, the appearance of the dropping part was evaluated according to the following criteria. Tables 7 and 8 show the results.
  S: The electrolyte-dropping part was not recognized after 20 minutes.
  A: The electrolyte-dropping part was not recognized after 15 minutes.
  B: The electrolyte-dropping part was not recognized after 10 minutes, but ring stain appeared after 15 minutes.
  C: The electrolyte-dropping part was not recognized after 5 minutes, but ring stain appeared after 10 minutes.

<Evaluation of Alcohol Resistance>

A 1-cm square cotton infiltrated with ethanol was applied to the coating layer of each of the packaging materials obtained in the Examples and Comparative Examples, and rubbed at a constant speed while applying a load of 500 g onto the cotton (alcohol rubbing method). After rubbing was repeated for a predetermined number of times, the occurrence of peeling of the coating film was evaluated according to the following criteria. Tables 7 and 8 show the results.
  A: No peeling occurred even after rubbing was repeated 20 times or more.
  B: No peeling occurred after rubbing was repeated 15 times, but peeling occurred after rubbing was repeated 20 times.
  C: No peeling occurred after rubbing was repeated 10 times, but peeling occurred after rubbing was repeated 15 times.

<Evaluation of Adhesion>

Using the packaging materials obtained in the Examples and Comparative Examples, the adhesion between the substrate layer 11 and the substrate protective layer 12 was evaluated in the following manner. Eleven cuts were made on a test surface using a cutter knife so that the interval of the cuts that reached the substrate was 1 mm, thereby forming 100 squares. Then, a cellophane tape was strongly bonded by pressure to the squares, and the end of the tape was peeled off at one stroke at an angle of 90°. The number of squares from which the coating film was not peeled was visually counted among the 100 squares, and evaluated. Tables 7 and 8 show the results.
  A: 100 squares were OK
  B: 90 to 80 squares were OK
  C: Less than 80 squares were OK
  <Evaluation of Drawing Depth>

For the packaging materials obtained in the Examples and Comparative Examples, drawing depth of deep drawing was evaluated by the following method. First, each packaging material 10 for a lithium ion battery was arranged in a forming apparatus with the sealant layer 17 facing upward. Forming depth of the forming apparatus was set to a rate of 1.0 to 7.0 mm per 0.25 mm and the packaging material was cold-formed in an environment of 23° C. room temperature and −35° C. dew point temperature. The punch die used had a rectangular transverse cross-section of 70 mm×80 mm, a bottom with 1.00 mm punch radius (RP), and a side face with 1.00 mm punch corner radius (RCP). The die used had an opening top with 1.00 mm die radius (RD). The presence/absence of breakage and pinholes in the cold-formed area was visually checked by irradiating the packaging material with light to thereby evaluate the maximum value of the drawing depth in which deep drawing was possible without causing breakage or pinholes. Moreover, the drawing depth was evaluated according to the following criteria. Tables 7 and 8 show the results.
  A: The difference from when the substrate protective layer was not provided (Comparative Example B1) was 0.75 mm or less.
  B: The difference from when the substrate protective layer was not provided was more than 0.75 mm and 1.25 mm or less.
  C: The difference from when the substrate protective layer was not provided was more than 1.25 mm.
  <Evaluation of Delamination>

The packaging materials obtained in the Examples, Reference Examples, and Comparative Examples were each cold-formed in the same manner as in the evaluation of forming depth, except that the forming depth of the forming apparatus was fixed at a rate of 3.5 mm. Ten samples of such cold-formed bodies were prepared for each Example, and allowed to stand in a high-temperature water environment (50° C. warm water) for one week. Then, the number of samples in which delamination occurred between the substrate layer 11 and the metal foil layer was counted for each environment, and evaluated according to the following criteria. Tables 7 and 8 show the results.
  A: 0 samples
  B: 1 to 3 samples
  C: 4 to 10 samples
  <Evaluation of Insulating Properties>

When the substrate and the substrate protective layer were formed on one surface of the metal foil layer, and the anticorrosion treatment layer was exposed on the other surface, the insulating properties were evaluated. A withstand voltage/insulation resistance tester ("TOS9201," produced by Kikusui Electronics Corporation) was used for the evaluation of insulating properties. The measurement was conducted in such a manner that one electrode was fixed to the exposed anticorrosion treatment layer side, water was added dropwise on the surface of the substrate protective layer, the other electrode was brought into contact with the dropping region, and a constant voltage of 100 V was applied.
  S: A resistance of 20000 MΩ or more was obtained.
  A: A resistance of 10000 MΩ or more and less than 20000 MΩ was obtained.
  B: A resistance of 2000 MΩ or more and less than 10000 MΩ was obtained.
  C: A resistance of less than 2000 MΩ was obtained.
  <Evaluation of Solvent Solubility>

Toluene was added to the polyol used in each Experimental Example, and stirred with a magnetic stirrer for a certain period of time. Then, the solubility of the polyol was evaluated according to the following criteria.
  A: The polyol was dissolved after 1 minute.
  B: Although undissolved polyol remained after 1 minute, the polyol was dissolved after 5 minutes.
  C: Undissolved polyol remained even after 5 minutes.

In the above evaluation, A and B are regarded as acceptable.

As is clear from the results shown in Tables 7 and 8, it was confirmed that the packaging materials of the Reference Examples or Examples B1 to B38 had deep drawing formability, delamination resistance, electrolyte resistance, and alcohol resistance, and also had adhesion to the adhesive tape and insulation properties. It was revealed that the electrolyte resistance, alcohol resistance, and insulation properties of Comparative Example B1, which did not have a substrate protective layer, were inferior to those of Reference Examples B1 to B3.

A comparison of Reference Examples B4 to B7 revealed that good electrolyte resistance, alcohol resistance, and formability were obtained when the ratio ([B]/[A]) of the number of moles of reactive groups of the curing agent [B] to the number of moles of reactive groups of the polyester resin or acrylic resin [A] in the substrate protective layer was within the range of 5 to 80. Further, a comparison of Reference Examples B8 to B10 revealed that good insulation properties were obtained when the above ratio ([B]/[A]) was within the range of 5 to 20.

When Examples B11 to B17 and Reference Examples B18 and B19 were compared, good PSA adhesion was obtained when the ratio ([a]/[b]) of the weight of the isocyanate other than an alicyclic isocyanate [a] to the weight of the alicyclic isocyanate [b] was 99/1 to 80/20. The reason that the electrolyte resistance and alcohol resistance of Reference Examples B18 and B19 were evaluated as B is considered to be attributable to swelling of the substrate protective layer with the solvent due to the bulky structure of IPDI-N.

Example B20 revealed that good electrolyte resistance and alcohol resistance were obtained by using an adduct or biuret form of an aliphatic isocyanate as the isocyanate other than an alicyclic isocyanate. Examples B21 to B24 revealed that high substrate adhesion of the substrate protective layer was obtained by adjusting the hydroxyl value of the polyester resin or acrylic resin to 5 to 100 KOHmg/g. A comparison of Examples B25 to B28 revealed that high delamination resistance was obtained by adjusting the thickness of the substrate protective layer to 1 to 7 and adjusting the ratio of the thickness of the substrate protective layer to the thickness of the substrate layer to 35% or less.

Examples B29 to B31 revealed that high deep drawing formability was obtained by adjusting the Tg of the substrate protective layer to 60 to 140° C.

Furthermore, Examples B32 to B34 revealed that higher deep drawing formability was obtained by adding a filler to the substrate protective layer, and Examples B35 to B38 revealed that the same performance was obtained even when the treatment of the anticorrosion treatment layer 15b was changed to chromate treatment.

REFERENCE SIGNS LIST

1 . . . Battery element; 2 . . . Lead; 10 . . . Packaging material (packaging material for power storage device);

11 . . . Substrate layer; 12 . . . Substrate protective layer; 13 . . . Adhesive layer; 14 . . . Metal foil layer; 15a, 15b . . . Anticorrosion treatment layer; 16 . . . Sealant adhesive layer; 17 . . . Sealant layer; 30 . . . Embossed packaging material; 32 . . . Shaped area (recess); 34 . . . Cover portion; 40 . . . Secondary battery.

What is claimed is:

1. A packaging material for a power storage device, comprising:
    a substrate protective layer,
    a substrate layer,
    an adhesive layer,
    a metal foil layer,
    a sealant adhesive layer,
    and a sealant layer
    wherein the substrate protective layer, the substrate layer, the adhesive layer, the metal foil layer, the sealant adhesive layer, and the sealant layer are laminated in this order,
    wherein the substrate protective layer is a cured product of a raw material containing a polyester resin, and a curing agent,
    wherein the polyester resin or the acrylic resin has reactive groups reactive with the curing agent at a terminal position and/or in a side chain,
    wherein the curing agent contains a first isocyanate, which is not an alicyclic isocyanate, and a second isocyanate, which is an alicyclic isocyanate, and
    wherein the ratio ([a]/[b]) of the weight of the first isocyanate [a] to the weight of the second isocyanate [b] is 99/1 to 80/20.

2. The packaging material for a power storage device of claim 1,
    wherein the ratio ([B]/[A]) of the number of moles of reactive groups of the curing agent [B] to the number of moles of reactive groups of the polyester resin [A] is 5 to 60.

3. The packaging material for a power storage device of claim 2,
    wherein the ratio ([B]/[A]) of the number of moles of reactive groups of the curing agent [B] to the number of moles of reactive groups of the polyester resin [A] is 5 to 20.

4. The packaging material for a power storage device of claim 1,
    wherein when a constant voltage of 100 V is applied for 3 minutes between the substrate protective layer and the metal foil layer in a state in which water is adhered to the substrate protective layer, which serves as an outermost layer of the packaging material, the electrical resistance is 2000 MΩ or more.

5. The packaging material for a power storage device of claim 1,
    wherein the reactive groups of the polyester resin are all hydroxyl groups, and the polyester resin has a hydroxyl value of 5 to 70 KOHmg/g.

6. The packaging material for a power storage device of claim 1,
    wherein the first isocyanate is an adduct or biuret form of an aliphatic isocyanate.

7. The packaging material for a power storage device of claim 1,
    wherein the polyester resin has a number average molecular weight of 2000 to 30000.

8. The packaging material for a power storage device of claim 1,
    wherein the substrate protective layer has a glass transition temperature (Tg) of 60 to 140° C.

9. The packaging material for a power storage device of claim 1,
    wherein the substrate protective layer further contains a filler.

10. The packaging material for a power storage device of claim 1,
    wherein the substrate protective layer has a thickness of 1 to 5 μm, and the ratio of the thickness of the substrate protective layer to the thickness of the substrate layer is 35% or less.

11. A method for manufacturing a packaging material for a power storage device, comprising:
    bonding a substrate layer to one surface of a metal foil layer via an adhesive layer;
    forming a substrate protective layer on a surface of the substrate layer on a side opposite of the adhesive layer, with the substrate protective layer being a cured product of a raw material containing a polyester resin, and a curing agent, the polyester resin having reactive groups reactive with the curing agent at a terminal position and/or in a side chain, the curing agent containing a first isocyanate, which is not an alicyclic isocyanate, and a second isocyanate, which is an alicyclic isocyanate, and the ratio ([a]/[b]) of the weight of the first isocyanate [a] to the weight of the second isocyanate [b] is 99/1 to 80/20; and
    forming a sealant layer via a sealant adhesive layer on a surface of the metal foil layer on a side opposite of the adhesive layer.

12. A method for manufacturing a packaging material for a power storage device, the method comprising:
    forming a substrate protective layer on one surface of a substrate layer, with the substrate protective layer being a cured product of a raw material containing a polyester resin, and a curing agent, the polyester resin having reactive groups reactive with the curing agent at a terminal position and/or in a side chain, the curing agent containing a first isocyanate, which is not an alicyclic isocyanate, and a second isocyanate, which an alicyclic isocyanate, and the ratio ([a]/[b]) of the weight of the first isocyanate [a] to the weight of the second isocyanate [b] is 99/1 to 80/20;
    bonding one surface of a metal foil layer via an adhesive layer to a surface of the substrate layer on a side opposite of the substrate protective layer; and
    forming a sealant layer via a sealant adhesive layer on a surface of the metal foil layer on a side opposite of the adhesive layer.

* * * * *